(12) United States Patent
Mase et al.

(10) Patent No.: US 6,334,075 B1
(45) Date of Patent: *Dec. 25, 2001

(54) DATA PROCESSOR PROVIDING INTERACTIVE USER CONFIGURATION OF DATA ACQUISITION DEVICE STORAGE FORMAT

(75) Inventors: Atsushi Mase; Teruyuki Harada; Haruki Kawamura; Masahiro Hirata; Tatsuhiro Ikeno; Emi Aisaka, all of Aichi; Tsuyoshi Kobayashi, Tokyo, all of (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/735,416

(22) Filed: Oct. 22, 1996

(30) Foreign Application Priority Data

Jan. 31, 1996 (JP) .................................................... 8-015632

(51) Int. Cl.[7] ............................. G05B 19/18; G06F 15/76
(52) U.S. Cl. ................................. 700/9; 712/37; 700/83
(58) Field of Search ................................ 707/1–204, 100, 707/104.1, 200; 700/17–20, 47, 65, 73, 83, 86, 87, 9; 717/1, 11; 710/10; 711/170; 712/1, 32–40

(56) References Cited

U.S. PATENT DOCUMENTS

| | | |
|---|---|---|
| 4,227,245 | 10/1980 | Edblad et al. . |
| 4,514,822 * | 4/1985 | Schneider et al. ................... 702/31 |
| 4,718,025 | 1/1988 | Minor et al. ....................... 364/550 |
| 4,747,060 * | 5/1988 | Sears, III et al. ................... 702/57 |
| 4,974,181 | 11/1990 | Sinderson et al. . |
| 5,062,052 * | 10/1991 | Sparer et al. .................. 364/475.02 |
| 5,295,063 * | 3/1994 | England ............................. 364/188 |
| 5,311,759 * | 5/1994 | Mangrulkar et al. ............... 72/11.6 |
| 5,375,221 * | 12/1994 | Wright et al. ...................... 711/100 |
| 5,376,930 * | 12/1994 | Merkle et al. ................. 340/825.35 |
| 5,428,555 * | 6/1995 | Starkey ......................... 364/551.01 |
| 5,442,344 * | 8/1995 | Merkle et al. ................. 340/825.35 |
| 5,471,596 * | 11/1995 | Brown, III ......................... 707/103 |
| 5,528,518 * | 6/1996 | Bradshaw et al. ................. 702/150 |
| 5,534,759 * | 7/1996 | Evans et al. ....................... 318/139 |
| 5,586,041 * | 12/1996 | Mangrulkar .................... 364/474.16 |
| 5,628,028 * | 5/1997 | Michelson ............................ 710/8 |
| 5,630,101 * | 5/1997 | Sieffert ............................... 710/11 |
| 5,638,299 * | 6/1997 | Miller ............................... 702/127 |
| 5,734,569 * | 3/1998 | Rogers et al. ...................... 701/33 |
| 5,754,424 * | 5/1998 | Melvin .............................. 364/157 |
| 5,761,520 * | 6/1998 | Mase et al. .......................... 712/1 |
| 5,764,546 * | 6/1998 | Bryant et al. ..................... 702/108 |
| 5,887,165 * | 3/1999 | Martel et al. ..................... 713/100 |
| 5,956,658 * | 9/1999 | McMahon .......................... 702/83 |
| 6,208,904 * | 3/2001 | Mullen, Jr. ........................... 700/9 |

FOREIGN PATENT DOCUMENTS 2 298 502   9/1996  (GB)  ............................ G06F/17/40

* cited by examiner

Primary Examiner—Maria N. Von Buhr
(74) Attorney, Agent, or Firm—Sughrue Mion, PLLC

(57) ABSTRACT

A data processing apparatus includes a storage format setting unit for setting a storage format in an interactive manner in order to store acquisition data, acquired from a control appliance connected thereto, a storage file forming unit for forming a storage file used to store the acquisition data based upon the storage format set by this storage format setting unit, and a storage unit for storing the acquisition data acquired from the control appliance in the storage file formed by this storage file forming unit according to the storage format set by the storage format setting unit.

20 Claims, 33 Drawing Sheets

FIG. 3

MAIN TABLE

| STORAGE FILE NAME | TRIGGER MONITORING INTERVAL | ACQUISITION DATA NUMBER |
|---|---|---|
| SEISAN.LOG | 1000 | 3 |

TRIGGER CONDITION TABLE

| STATION NUMBER | DEVICE TYPE | DEVICE NO. | DEVICE CONDITION |
|---|---|---|---|
| 1 | W | 100 | =0 |

ACQUIRING DATA TABLE

| RECORD NO. | ACQUISITON DATA NAME | STATION NUMBER | DEVICE TYPE | HEAD DEVICE NO. | DEVICE NUMBER | ACQUISITION TYPE | PROCESSING FORMULA | STORAGE TYPE |
|---|---|---|---|---|---|---|---|---|
| 1 | PRODUCT NO. | 1 | W | 0 | 6 | TEXT | NONE | TEXT |
| 2 | PRODUCTION COMPLETION NUMBER | 1 | D | 100 | 2 | INTEGER | NONE | INTERGER |
| 3 | MEASUREMENT VALUE | 2 | R | 50 | 2 | INTEGER | ÷1000 | REAL NUMBER |

FIG. 4

| PRODUCT NUMBER | PRODUCTION COMPLETION NUMBER | MEASUREMENT VALUE |
|---|---|---|
|  |  |  |

FIG. 5

| PRODUCT NUMBER | PRODUCTION COMPLETION NUMBER | MEASUREMENT VALUE |
|---|---|---|
| ⋮ | ⋮ | ⋮ |
| ⋮ | ⋮ | ⋮ |
| SN0121 | 23456 | $7.65432 \times 10^{\wedge}2$ |

FIG. 6

| W0 | W1 | W2 | W3 | W4 | W5 | ... |
|---|---|---|---|---|---|---|
| 83 | 78 | 48 | 49 | 50 | 49 |  |

| D0 | D1 | ... | D100 | D101 | ... |
|---|---|---|---|---|---|
| 0 | 0 |  | 2 | 3456 |  |

| R0 | R1 | ... | R50 | R51 | ... |
|---|---|---|---|---|---|
| 0 | 0 |  | 76 | 5432 |  |

FIG. 11

MAIN TABLE

| DESCRIPTIVE FILE NAME | TRIGGER MONITORING INTERVAL | WRITE DATA NUMBER | WRITING NUMBER |
|---|---|---|---|
| SEISAN.LOG | 1000 | 3 | 2 |

TRIGGER CONDITION TABLE

| STATION NUMBER | DEVICE TYPE | DEVICE NO. | DEVICE CONDITION |
|---|---|---|---|
| 1 | W | 100 | =0 |

WRITING DATA TABLE

| RECORD NO. | WRITE DATA NAME | STATION NUMBER | DEVICE TYPE | HEAD DEVICE NO. | DEVICE NUMBER | WRITING TYPE | PROCESSING FORMULA | DESCRIPTIVE TYPE |
|---|---|---|---|---|---|---|---|---|
| 1 | PRODUCT NUMBER | 1 | W | 0 | 6 | TEXT | NONE | TEXT |
| 2 | PRODUCTION COMPLETION NUMBER | 1 | D | 100 | 2 | INTEGER | NONE | NONE |
| 3 | MEASUREMENT VALUE | 2 | R | 50 | 2 | INTEGER | ×1000 | REAL NUMBER |

FIG. 12

| PRODUCT NUMBER | PRODUCTION COMPLETION NUMBER | MEASUREMENT VALUE |
|---|---|---|
|  |  |  |

FIG. 13

| PRODUCT NUMBER | PRODUCTION COMPLETION NUMBER | MEASUREMENT VALUE |
|---|---|---|
| SN0120 | 12345 | $6.54321 \times 10^{\wedge}2$ |
| SN0121 | 23456 | $7.65432 \times 10^{\wedge}2$ |

FIG. 14

| W0 | W1 | W2 | W3 | W4 | W5 | ... |
|---|---|---|---|---|---|---|
| 83 | 78 | 48 | 49 | 50 | 49 |  |

| D0 | D1 | ... | D100 | D101 | ... |
|---|---|---|---|---|---|
| 0 | 0 |  | 2 | 3456 |  |

| R0 | R1 | ... | R50 | R51 | ... |
|---|---|---|---|---|---|
| 0 | 0 |  | 76 | 5432 |  |

FIG. 19

MAIN TABLE

| DESCRIPTIVE FILE NAME | TRIGGER MONITORING INTERVAL | WRITE DATA NUMBER | WRITE NUMBER |
|---|---|---|---|
| SEISAN.LOG | 1000 | 3 | 2 |

TRIGGER CONDITION TABLE

| STATION NUMBER | DEVICE TYPE | DEVICE NO. | DEVICE STATE |
|---|---|---|---|
| 1 | W | 100 | = 0 |

PRODUCTION INSTRUCTION DATA TABLE

| RECORD NO. | WRITE DATA NAME | STATION NUMBER | DEVICE TYPE | HEAD DEVICE NO. | DEVICE NUMBER |
|---|---|---|---|---|---|
| 1 | PRODUCT NUMBER | 1 | W | 0 | 6 |
| 2 | PRODUCTION COMPLETION NUMBER | 1 | R | 100 | 2 |
| 3 | MEASUREMENT VALUE | 2 | D | 50 | 2 |

RETRIEVE DATA TABLE

| RETRIEVE FIELD NAME | STATION NUMBER | DEVICE TYPE | DEVICE NO. |
|---|---|---|---|
| PRODUCT NUMBER | 1 | W | 200 |

FIG. 20

PRODUCTION INSTRUCTION DATA TABLE

| RECORD NO. | PRODUCT NUMBER | PRODUCTION NUMBER | COLOR CODE | MACHINE TYPE |
|---|---|---|---|---|
| 1 | 10 | 100 | 7 | 1 |
| 2 | 50 | 25 | 4 | 4 |
| 3 | 100 | 50 | 3 | 5 |
| 4 | 125 | 75 | 8 | 2 |
| 5 | 140 | 200 | 2 | 8 |

FIG. 23

MAIN TABLE

| PRODUCTION INSTRUCTION FILE NAME | TRIGGER MONITORING INTERVAL | WRITE DATA NUMBER |
|---|---|---|
| START.DAT | 1000 | 2 |

TRIGGER CONDITION TABLE

| STATION NUMBER | DEVICE TYPE | DEVICE NO. | DEVICE CONDITION |
|---|---|---|---|
| 1 | W | 100 | = 0 |

WRITING DATA TABLE

| RECORD NO. | WRITE DATA NAME | STATION NUMBER | DEVICE TYPE | HEAD DEVICE NO. | DEVICE NUMBER |
|---|---|---|---|---|---|
| 1 | PRODUCT NUMBER | 1 | W | 0 | 1 |
| 2 | PRODUCTION INSTRUCTION NUMBER | 1 | D | 100 | 2 |

FIG. 24

| PRODUCT NUMBER | PRODUCTION INSTRUCTION NUMBER |
|---|---|
| 12345 | 234567 |

| CONTROL APPLIANCE DEVICE MONITORING INTERVAL | STATION NUMBER | DEVICE TYPE | DEVICE NO. | PLC DEVICE DATA COMPARISON VALUE |
|---|---|---|---|---|
|  |  |  |  |  |

| ACCUMULATION TIME | ELAPSE TIME | NUMBER |
|---|---|---|
|  |  |  |

FIG. 31

| LABEL | a | | b | | c | d | e | |
|---|---|---|---|---|---|---|---|---|
| READ DESTINATION CONTROL APPLIANCE | PLC 1 | PLC 1 | PLC 1 | PLC 2 | PLC 2 | PLC 1 | PLC 1 | PLC 2 |
| DEVICE NAME | D | D | D | D | D | D | D | D |
| DEVICE NO. | 0 | 100 | 10 | 550 | 800 | 300 | 450 | 950 |
| ⋮ | | | | | | | | |

FIG. 32

| | COMMUNICATION MEANS 124a | COMMUNICATION MEANS 124b |
|---|---|---|
| READ DESTINATION CONTROL APPLIANCE | PLC 1 | PLC 2 |
| DEVICE NAME | D | D |
| HEAD READ NO. | 0 | 500 |
| READ POINT | 500 | 500 |

| ARRANGEMENT NUMBER | 0 | 1 | 4 | 7 | 2 | 6 | 3 | 5 | -------- |
|---|---|---|---|---|---|---|---|---|---|
| PLC NO. | 1 | 1 | 1 | 1 | 2 | 2 | 3 | 3 | -------- |
| DEVICE NAME | D | D | D | D | D | D | D | D | -------- |
| DEVICE NO. | 0 | 100 | 800 | 950 | 10 | 450 | 550 | 300 | -------- |

FIG. 38

| ARRANGEMENT NO. | |
|---|---|
| 0 | FIRST TRIGGER INFORMATION OF PLC 1 |
| 1 | SECOND TRIGGER INFORMATION OF PLC 1 |
| 2 | THIRD TRIGGER INFORMATION OF PLC 1 |
| 3 | FOURTH TRIGGER INFORMATION OF PLC 1 |
| 4 | FIRST TRIGGER INFORMATION OF PLC 2 |
| 5 | SECOND TRIGGER INFORMATION OF PLC 2 |
| 6 | FIRST TRIGGER INFORMATION OF PLC 3 |
| 7 | SECOND TRIGGER INFORMATION OF PLC 3 |
| ⋮ | ⋮ |

FIG. 39

| ARRANGEMENT NO. | 0 | 1 | 2 | 3 | 4 | 5 | 6 | 7 | -------- |
|---|---|---|---|---|---|---|---|---|---|
| PLC NO. | 1 | 1 | 2 | 3 | 1 | 3 | 2 | 1 | -------- |
| DEVICE NAME | D | D | D | D | D | D | D | D | -------- |
| DEVICE NO. | 0 | 100 | 10 | 550 | 800 | 300 | 450 | 950 | -------- |

US 6,334,075 B1

DATA PROCESSOR PROVIDING INTERACTIVE USER CONFIGURATION OF DATA ACQUISITION DEVICE STORAGE FORMAT

BACKGROUND OF THE INVENTION

1. Field of the Invention

The present invention relates to a data processing apparatus for acquiring via a communication line, data saved by a control appliance having a storage apparatus such as a plurality of programmable logic controllers (hereinafter referred to as a "PLC") and programmable controllers (hereinafter referred to as a "PC") connected to each other, and for storage, acquiring, and writing the data in useful formats.

2. Description of the Related Art

FIG. 44 is a block diagram for showing an arrangement of a conventional data acquiring/storing apparatus. In this drawing, reference numeral 1 shows a control apparatus for controlling an appliance connected thereto. To this control apparatus 1, a CRT2 functioning as a display unit, a keyboard 3 functioning as an input unit, and a control appliance 4 containing a plurality of PLCs and a plurality of PCs are connected.

Within the controller 1, there are provided a CPU 11 for executing a user program, a memory 12 for storing a user application program, an auxiliary storage unit 13 having a database formatted storage file 131 for storing data acquired from the control appliance 4, an interface 141 for interfacing to the CRT2, another interface 142 for interfacing to the keyboard 3, and also a further interface 143 for interfacing to the control appliance 4.

The conventional data acquiring/storing apparatus is arranged in the above-described manner. In this data acquiring/storing apparatus, for instance, the database formatted storage file 131 is formed inside the auxiliary storage unit 13 in accordance with the user application program formed by the user himself, and then the data acquired from the control appliance 4 is stored into this storage file 131.

The conventional data processing apparatus is arranged as described above, and the user himself must produce the user application program in order to form the storage file for storing therein the necessary data acquired from the control appliance. Therefore, this user programming work would require huge amounts of workload, time; and knowledge, so that the efficiency of programming work would be lowered, but also a large amount of workload would be required to correct the user application program. A similar heavy workload is required to produce such programs, i.e., setting of conditions used to acquire the data from the control appliance, and setting of the production instruction to the control appliance, and also to form a descriptive file used to store write data to be written into the control appliance. No one can readily perform this work.

Also, in order that the data acquired from the control appliance is made as a suitable data format for the user, a further fine setting work should be carried out, resulting in a further heavy workload.

Moreover, as to setting of the data transmission between the control appliance and the data processing apparatus, this setting work cannot be easily performed by the user.

In such a case that a plurality of control appliances are connected to the data processing apparatus while transmitting the data, there is another problem that this data transmission would require a large amount of time.

Also, even when the end request for notifying the end of data processing is inputted, this data processing apparatus does not execute the end processing in response to this end request unless predetermined waiting time has passed. Accordingly, the response characteristic to the end request would be deteriorated.

SUMMARY OF THE INVENTION

The present invention has been made to solve the above-described problems, and therefore, a primary object thereof to provide a data processing apparatus capable of readily setting a data processing operation by a user himself.

A secondary object of the present invention is to provide a data processing apparatus capable of storing therein data acquired from a control appliance in an easy-usable format without reprocessing this data.

Furthermore, a third object of the present invention is to provide a data processing apparatus capable of reaching the number of data to be transmitted between the control appliance and the data processing apparatus.

In addition, a fourth object of the present invention is to provide a data processing apparatus capable of having a better response characteristic to an end request.

A data processing apparatus, according to the present invention, comprises: storage format setting means for setting a storage format in an interactive manner in order to store acquisition data in an arbitrary format, acquired from a control appliance connected thereto; storage file forming means for forming a storage file used to store said acquisition data based upon the storage format set by this storage format setting means; and storage means for storing the acquisition data acquired from said control appliance in the storage file formed by this storage file forming means in accordance with the storage format set by said storage format setting means.

Also, a storage processing apparatus of the invention comprises: descriptive format setting means for setting a descriptive format in an interactive manner in order to store acquisition data in an arbitrary format acquired from a control appliance connected thereto; descriptive file forming means for forming a descriptive file based upon the descriptive format set by this descriptive format setting means; and write means for writing write data to said control means into the descriptive file formed by this descriptive file forming means.

One of the storage means and the write means processes the acquisition data acquired from the control appliance, or the write data to be written into the control appliance in a preselected format by employing a designated condition formula, and thereafter stores or describes the processed data.

One of the acquisition data acquired from the connected control appliance and the write data for the connected control appliance is simultaneously set by the storage format setting means or the descriptive format setting means.

Also, another data processing apparatus of the invention comprises: acquisition data setting means for setting a condition used to acquire acquisition data from a control appliance connected thereto; and data acquiring means for acquiring the acquisition data from said control appliance based upon the condition set by this acquisition data setting means.

The acquisition data acquired from the control appliance by the data acquiring means is compared with predetermined monitor comparison data to thereby store a history when said acquisition data is coincident with said monitor comparison data.

Further, the data processing apparatus of the invention comprises: a production instruction data file for storing therein production instruction data on which processing conditions for each of products manufactured by the connected control appliance have been described; comparing means for comparing a specific item of the production instruction data stored in this production instruction data file with the acquisition data acquired from the control appliance; and production instructing means for instructing said control appliance to start a production when said comparing means judges that said acquisition data corresponds to the specific item of said production instruction data based upon said production instruction data corresponding to said acquisition data.

Also, the data processing apparatus of the invention comprises editing means for editing the condition data for the data acquisition set so as to acquire the acquisition data from the connected control appliance in unit of said connected control appliance.

The acquisition data acquired every control appliance are restored in correspondence with the conditions set by said acquisition data setting means.

Also, the data processing apparatus of the invention comprises: a waiting time registering unit for registering therein waiting time in order to interrupt a data processing operation; and an end request accepting unit for subdividing said waiting time every preselected time interval, and for judging as to whether or not an end request is inputted, which instructs an end of the data processing operation, every subdivided time interval; in which: when said end instruction accepting unit judges such that the end request is entered, the data processing operation is accomplished.

The above and other objects and features of the present invention will be more apparent from the following description taken in conjunction with the accompanying drawings.

BRIEF DESCRIPTION OF THE DRAWINGS

FIG. 3 is a conceptional drawing indicating a setting data file for storing data indicative of a storage format of a storage file set by way of an interactive manner;

FIG. 4 is a diagram representing a database formatted storage file;

FIG. 5 is a diagram indicating a condition of a storage file of acquisition data acquired when the data is coincident with a trigger condition;

FIG. 6 is a diagram showing device data stored in a control appliance at a certain time instant;

FIG. 11 is a conceptional drawing indicating a setting data file for storing data indicative of a descriptive/format of a descriptive file set by way of an interactive manner;

FIG. 12 is a diagram representing a database formatted descriptive file;

FIG. 13 is a diagram indicating a condition of a descriptive file of writing data acquired when the data is coincident with a trigger condition;

FIG. 14 is a diagram showing device data stored in a control appliance 4 at a certain time instant;

FIG. 19 is a conceptional drawing indicating a setting data file set by way of an interactive manner;

FIG. 20 is a diagram representing a previously formed production instruction data file;

FIG. 23 is a conceptional diagram representing a setting data file set in an interactive manner based upon a writing data setting program;

FIG. 24 is a diagram showing a database formatted production instruction data file;

FIG. 31 is a diagram showing only data about "read destination control appliance name", "read device name", and "device No." among data stored in a label;

FIG. 32 is a diagram showing data about contents of a table into which a relationship between each of communication means, a control appliance, and a device are stored;

FIG. 38 is a block diagram showing an arrangement of a trigger data storage table;

FIG. 39 is a diagram indicating a content of a label in detail;

DETAILED DESCRIPTION OF THE PREFERRED EMBODIMENTS (Embodiment 1)

Referring now to FIG. 1 to FIG. 8, a data acquiring/storing method according to an embodiment of the present invention will be described.

Figure 1:
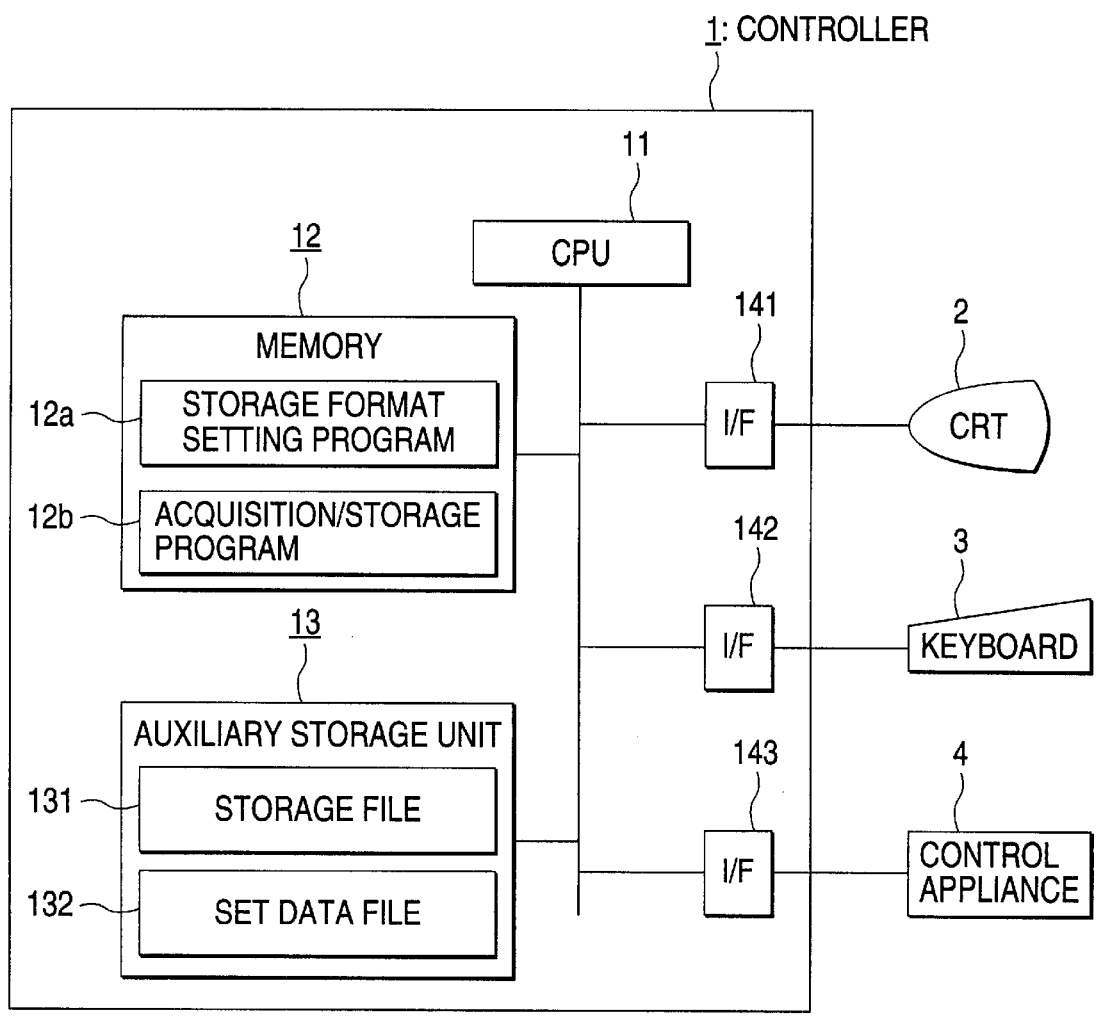
FIG. 1 is a block diagram showing an arrangement of a data processing apparatus having an acquisition/storage function according to an embodiment of the present invention.

FIG. 1 is a block diagram for representing an arrangement of a data processing apparatus having an acquisition/storage function according to an embodiment of the present invention. In this drawing, reference numeral 1 shows a control apparatus (controller) for controlling an appliance connected thereto. To this controller 1, a CRT2 functioning as a display unit, a keyboard 3 functioning as an input unit, and a control appliance 4 containing a plurality of PLCs and a plurality of PCs are connected.

Within the controller 1, there are provided a CPU11 for executing a user application program and a program such as a preset control program, a memory 12 for storing the user application program and the preset control program, an auxiliary storage unit 13 having a storage file 131 corresponding to a first storage file with a database format which stores data acquired from the control appliance 4, and also having a setting data file 132 for storing therein a storage format of the storage file 131, an interface 141 for interfacing to the CRT2, another interface 142 for interfacing to the keyboard 3, and also a further interface 143 for interfacing to the control appliance 4.

It should be noted that the control program stored in the memory 12 contains a storage format setting program 12a and an acquisition/storage program 12b. The storage format setting program 12a corresponds to a storage format setting means capable of setting a desired storage format of the storage file 131 by employing the keyboard 3 and a mouse by an operator in an interactive manner displayed on the CRT2. The acquisition/storage program 12b corresponds to a storage means for storing therein a data acquiring method, a data processing method, and a data storing method.

Figure 2:
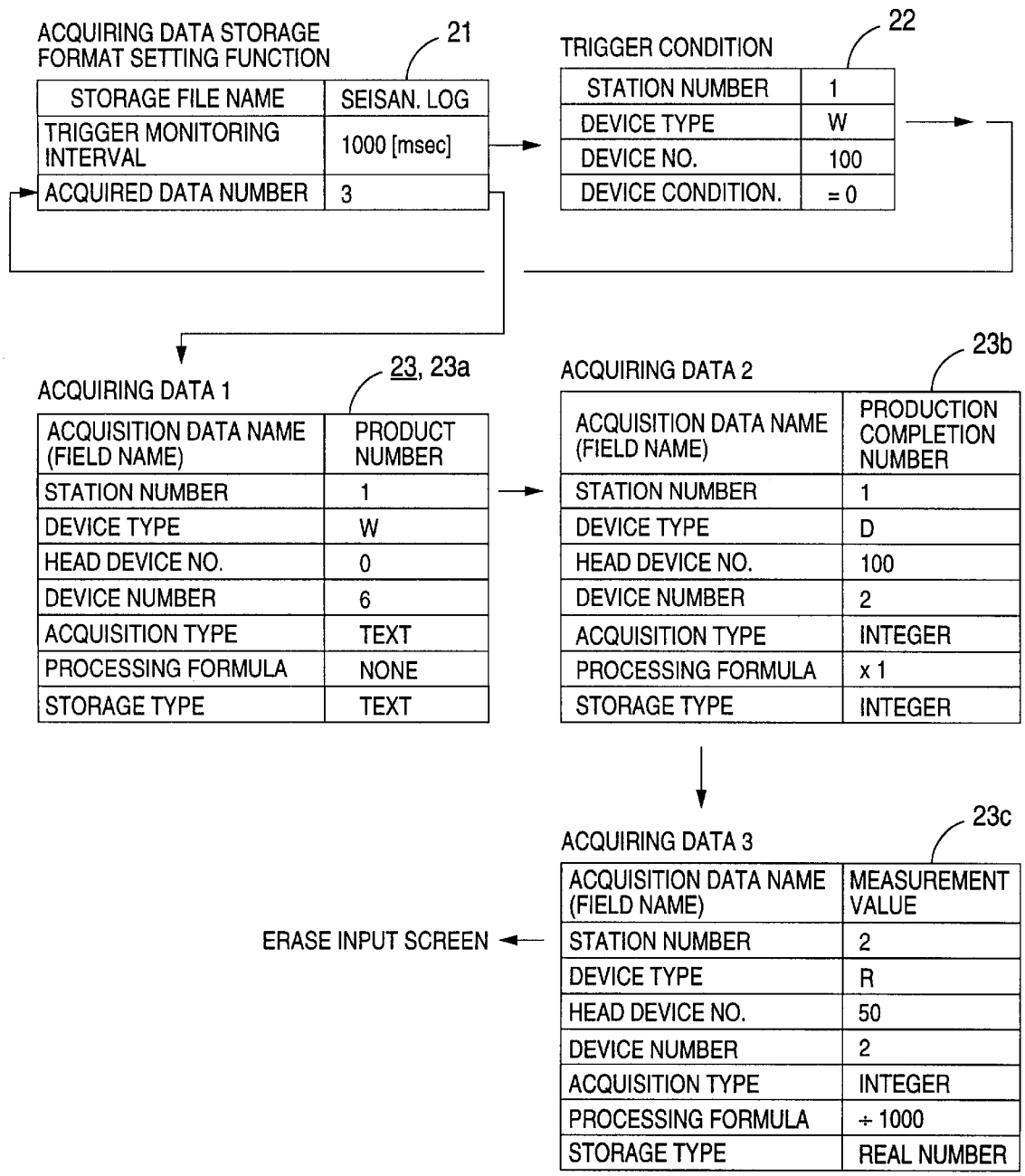
FIG. 2 is a screen arrangement diagram showing a screen arrangement of a display screen displayed on a CRT based upon a storage format setting program.

FIG. 2 schematically shows a screen arrangement for representing a display screen of the CRT2 displayed on a storage format setting program 12a.

In this drawing, reference numeral 21 indicates a main display screen. On this main display screen 21, a file name of the storage file 131 set into the auxiliary storage unit 13; a trigger monitoring interval corresponding to an interval used to monitor a trigger condition for acquiring the data from the control appliance 4; and also the acquisition data number used to determine how much data is acquired are set. Reference numeral 22 indicates a trigger condition setting screen. A station number, a device type, the number of this device, and a device state, constituting a trigger condition used to acquire the data, are set on this trigger condition setting screen 22.

Reference numeral 23 shows an acquiring data/storage format setting screen used to set which data is acquired, and further how to store the data acquired from the control appliance 4. On this acquiring data/storage format setting screen 23, the following items are set, namely, an acquisition data name for designating a name of data to be acquired; a station number of the control appliance 4 from which the data should be acquired; a device type; and a head device number for designating which device is started within the device type. Furthermore, there are a device number for designating how many device data are acquired from the head device No.; an acquisition type for designating a type of acquired device; a process formula for setting how to process the acquired data based upon a formula using the four basic arithmetic operations; and a storage format for designating a format used when the processed data is stored. Reference numerals 23a, 23b, 23c are screens for setting how to acquire/store the acquiring data in response to the acquired data number set on the main display screen 21.

FIG. 3 is a conceptional diagram for showing a set data file 132 for storing data indicative of the storage format of the storage file 131 set in the interactive manner (see FIG. 2). In this drawing, reference numeral 132a shows a main table for indicating the content set on the main display screen 21, reference numeral 132b is a trigger condition table for showing the content set on the trigger condition setting screen 22, and reference numeral 132c is an acquiring data table for showing the content set on the acquiring data/storage format setting screen 23.

FIG. 4 is a diagram for representing, for instance, the storage file 131 formed in accordance with this embodiment. The storage file 131 is formed such that the acquiring data number is selected to "3", and the acquired data name of this data to be acquired is "product number", "production completion number", and "measurement value".

FIG. 5 is such a diagram for indicating a condition of the storage file 131 for the data acquired when the data is actually coincident with the trigger condition in accordance with this embodiment.

FIG. 6 is a diagram for showing device data stored in the control appliance 4, for example, at a certain time.

Figure 7:
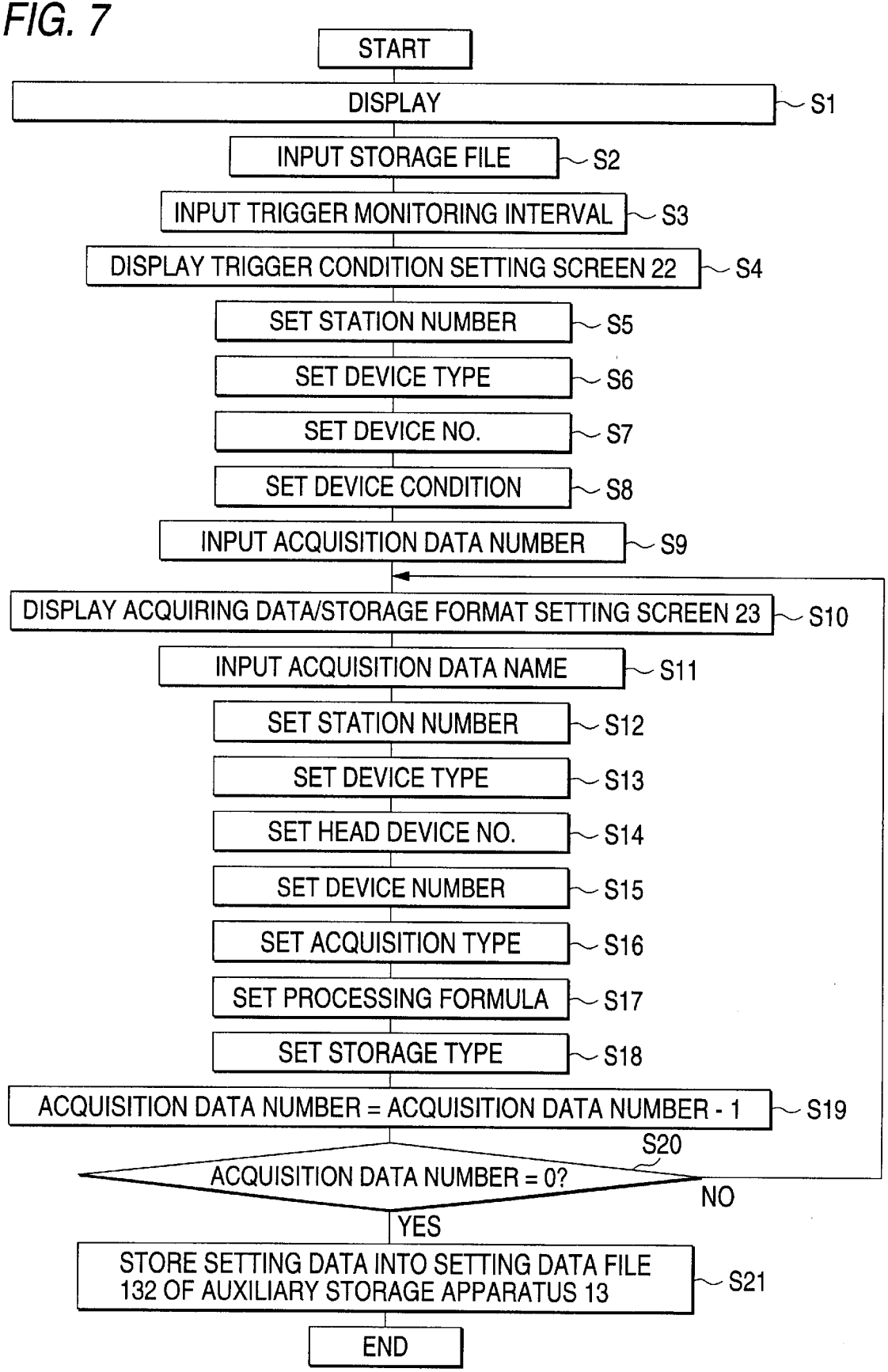
FIG. 7 is a flow chart showing operations when an operator sets a storage format of a storage file in an interactive manner.

FIG. 7 is a flow chart for describing operations when an operator sets the storage format of the storage file 131 in the interactive manner based on the storage format setting program 12a previously stored in the memory 12. The setting data file 132 is fabricated in accordance with a series of flow operation defined in this flow chart.

Figure 8:
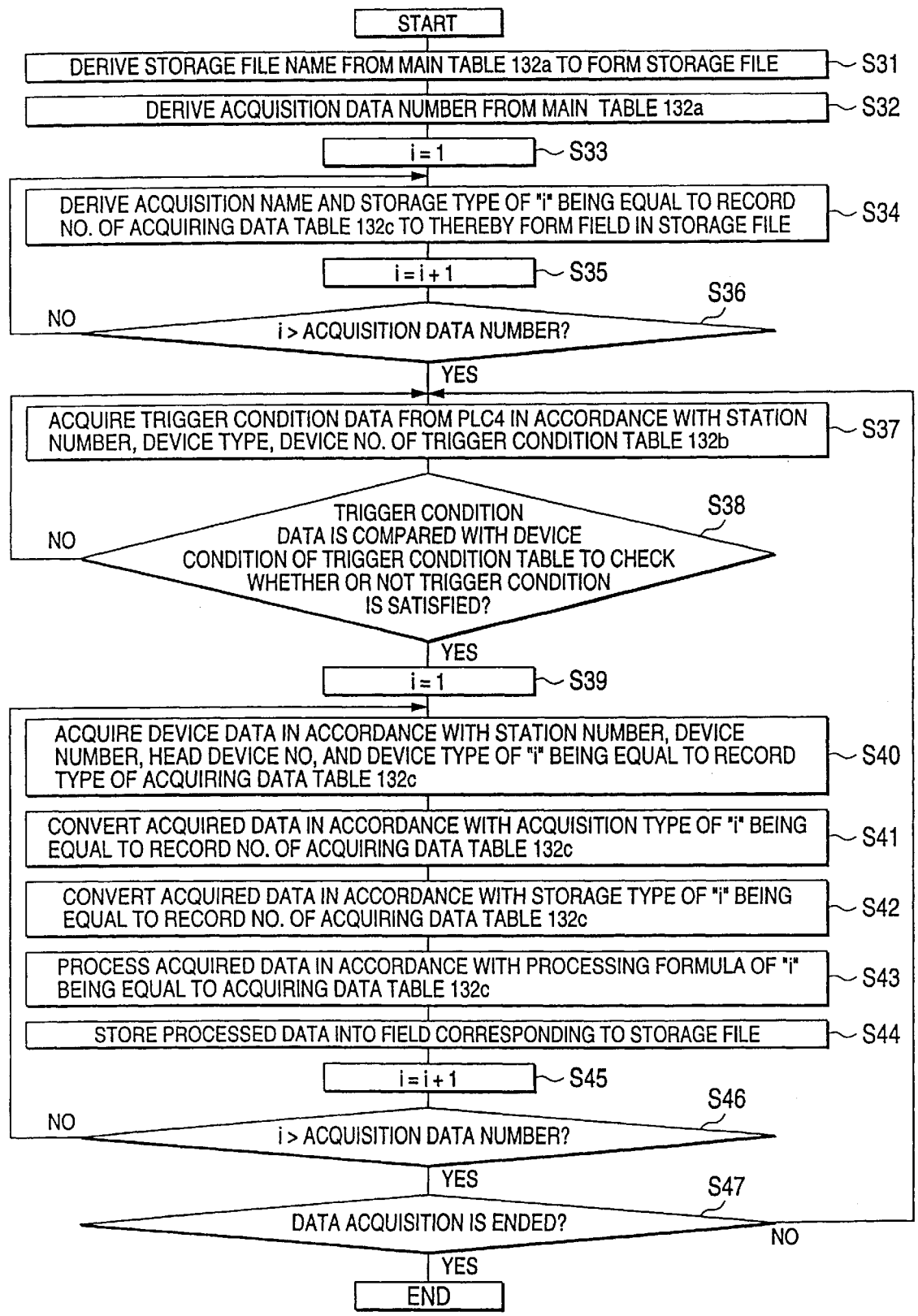
FIG. 8 is a flow chart representing operations when data is acquired from a control appliance based upon a setting data file and an acquisition/storage program.

FIG. 8 is another flow chart for describing operations when the data is acquired from the control appliance 4 based upon the set data file 132 and the acquisition/storage program 12b. The storage file 131 is produced by executing a series of flow operations defined in this flow chart.

Referring now to drawings, operations of this embodiment 1 will be explained.

A conceptional operation executed by the CPU 11 will now be described with reference to FIG. 1.

The operator sets (inputs) a desirable storage format of the storage file 131 by operating the keyboard 3 in the interactive manner based upon the storage format setting program 12a (see FIG. 2).

Then, these storage formatted data are saved in the database type setting data file 132 stored in the auxiliary storage unit 13 (see FIG. 3).

Next, with reference to the set data file 132, the database type storage file 131 used to store therein the data acquired from the control appliance 4 is formed (see FIG. 4).

Thereafter, referring now to the acquisition/storage program 12b and the setting data file 132, the data of the control appliance 4 which has been set for the data acquisition is acquired. After the acquired data has been processed based on the storage format, the processed data is stored in the storage file 131 (see FIG. 5).

Next, a detailed explanation is made of a method for acquiring/storing subject data of the controller 1.

In the flow chart of FIG. 7, when the operator first initiates the controller 1 by way of the keyboard 3, the main display screen 21 is displayed on the CRT 2 at a step S1 in order to set the acquiring data/storage format shown in FIG. 2.

On the displayed main display screen 21, the file name for storing the acquired data is inputted (step S2). This corresponds to "SEISAN.LOG" on the main display screen 21 of FIG. 2. Then, the trigger monitoring interval is inputted which is equal to such an interval used to see whether or not it is coincident with the trigger condition (step S3). This corresponds to "1000" on the main display screen 21.

When the entries of the storage file name and the trigger monitoring interval have been accomplished on the main display screen 21, the process operation is advanced to a step S4 at which the screen of the CRT 2 is switched into the trigger condition setting screen 22 used to set the trigger condition.

Then, a station number of the control appliance 4 is set which constitutes the trigger for acquiring the data from a plurality of control appliances 4 (step S5). A device type of the set control appliance 4 is set (step S6). A device number of this device is set (step S7), and furthermore a device condition thereof is set (step S8).

It should be noted in this embodiment that the station number is "1", the device type is "W", the device number is "100", and the device condition is "=0".

In other words, this trigger condition implies that this trigger condition can be satisfied when the value of the number 100 of the device type W for the station number 1 of the control appliance 4 becomes 0.

When the entry of the trigger condition is accomplished on the trigger condition setting screen 22 displayed on the CRT 2, the display condition is again returned to the main display screen 21, at which the data number acquired when the trigger condition is made coincident is entered (step S9). This corresponds to "3" on the main display screen 21 of FIG. 2.

When the entry of the acquired data number on the main display screen 21 is accomplished, this main display screen 21 on the CRT 2 is changed into the acquiring data/storage format setting screen 23 used to set the storage format of the acquired data (step S10). In this case, since the acquiring data number is selected to be "3", there are three setting operations of the acquired data.

On the acquiring data/storage format setting screen 23, a screen 23a used to set the first acquiring data is displayed, and then the acquiring data 1 is set. An acquiring data name for designating a name of acquired data is set (step S11), a station number of a control appliance 4 from which data should be acquired is set (step S12), and a device type is set (step S13). A head device No. for designating that the set device is started from which device within the device types is set (step S14), a device number for designating how much device data is acquired from the head device No. is set (step S15), an acquisition type for designating a type of a device to be acquired is set (step S16), a processing formula is set which sets how to process the acquired data based on the formula with employment of the four basic arithmetic operations (step S17), and further, a type of storage for designating a type when the processed data is stored is set (step S18).

As to the acquiring data 1, the acquiring data name is "product number"; the station number is "1"; the device type is "W"; the head device No. is "0"; the device number is "6"; the acquisition type is "text"; and the processing formula is "none" which represents that the data is not processed. Furthermore, the processing formula is "text".

In this case, the acquiring data 1 implies that such data are acquired in the text type from the head device No. being "0" of the device type W of the control appliance station number 1 up to six devices, namely from W0 to W5, and then these data are stored in the text type at the product number to which the field name of the storage file belongs.

At a next step S19, the acquisition data number is subtracted by 1 and the process operation is advanced to a step S20.

At this step S20, a check is done as to whether or not the acquisition data number "3" set on the main display screen 21 of FIG. 2 becomes "0".

If the acquisition data number set at this step is not equal to 0, then the process operation is returned to the step S10 at which the screen 23b for setting the second acquiring data 2 is displayed. As to the acquiring data 2, the setting operations from the step S11 to the step S18 are carried out in a similar manner to the above-described acquiring data 1.

Furthermore, this setting operation is similarly performed to the acquiring data 3.

The acquiring data 2 implies that such data are acquired in the integer type from 100 of the head device No. of the device type D for the control appliance station number 1 to two devices, namely D100 and D101, and then these data are stored in the integer type at which the field name of the storage file is the production accomplished number. Furthermore, the acquiring data 3 implies that such data are acquired in the integer type from 50 of the head device No. of the device type R for the control appliance station number 2 to two devices, namely R50 and R51, and then these data are multiplied by $\frac{1}{1000}$, and thereafter, the multiplied data are stored in the real number type at which the field name of the storage file is the measurement value.

When the set acquiring data number becomes 0 at the step S20, the process operation is advanced to a step S21 at which the set acquiring data/storage type data is saved in the database type set data file 132 (shown in FIG. 3) within the auxiliary storage unit 13. Thereafter, the data setting operation is accomplished, so that the input screen is erased.

It should be noted that the contents of the database type setting data file 132 shown in FIG. 3 correspond to the data set from the display screen used to set the acquiring data/storage format shown in FIG. 2 in an one-to-one correspondence.

The data set on the main display screen 21 is saved in the trigger condition table 132a of FIG. 3, the data set on the trigger condition setting screen 22 is saved in the trigger condition table 132*b* of FIG. 3, and also the data set on the acquiring data/storage format setting screen 23 is saved in the acquiring data table 132*c* of FIG. 3.

Referring now to a flow chart of FIG. 8, a method for acquiring the data from the control appliance 4, executed by the controller 1, will be explained in detail.

First, when the operator initiates the controller 1 via the keyboard 3 after the acquiring data/storage format has been set, the CPU11 derives a "storage file name" from the main file 132 within the auxiliary storage unit 13 to form the storage file 131 in this auxiliary storage unit 13 at a step S31. This implies that the storage file having such a file name as "SEISAN.LOG" in the setting data file 132 of FIG. 3.

Then, at a step S32, the CPU derives a field "acquired data number" of a main table of the setting data file 132. This acquired data number is equal to "3". Furthermore, an initial value "1" is substituted for a variable "i" at a step S33.

At a step S34, the field "acquired data name" and the "storage type" of "i" equal to the record No. of the acquiring data table 132*c* of the setting data file 132 are derived, and then a field is formed in the storage file 131 such that the "acquired data name" is a name of field, and also the "storage type" is a type of field. This means that in the setting data file 132 of FIG. 3, the record No. 1 forms such a field whose name is "product number" and whose field type is "text"; the record No. 2 forms such a field whose name is "production completion number" and whose field type is "integer"; and further the record No. 3 forms such a field whose name is "measurement value", and whose type is "real number" (see FIG. 4).

Thereafter, at a step S35, 1 is added to the variable "i". At a step S36, a check is made as to whether or not the variable "i" is larger than the acquired data number derived at the step S32. If the variable "i" is not larger than the acquired data number, then the process operation is again returned to a step S34. Conversely, if the variable "i" is greater than the acquired data number, then the process operation is advanced to a step S37.

At this step S37, the field "station number", "device type", and "device No." of the trigger condition table 132*b* of the setting data file 132 are derived, and the data for the trigger condition is acquired from the control appliance 4 in accordance with the set data.

In the setting data file 132 of FIG. 3, such device data as the station number "1", the device type "W", and the device No. "100" are acquired.

At a step S38, the field "device condition" of the setting data file is derived and is compared with the acquired data for the trigger condition in order to check whether or not the trigger condition can be satisfied.

Since the device condition is equal to "0" in the setting data file 132 of FIG. 3, another check is done as to whether or not the acquired data for the trigger condition is equal to "0". When the trigger condition cannot be satisfied, the process operation is returned to the step S37 at which the data acquisition for the trigger condition is continued.

In the case that the trigger condition can be satisfied, the initial value 1 is substituted for the variable "i".

At a step S40, the field "station number", "device type", "head device No.", and "device number" of "i" equal to the record No. of the acquiring data table 132*c* of the set data file 132 are derived, and the device data of the control appliance 4 is acquired in accordance with the set data. In the setting data file 132 of FIG. 3, this is to acquire the following data. In the record No. 1, the data about the station number "1", the device type "W", the head device No. "0", and the device number "6" are acquired. In the record No. 2, the data about the station number "1", the device type "D", the head device No. "100", and he device number "2" are acquired. In the record No. 2, the data about the station number "1", the device type "R", the head device No. "50", and the device number "2" are acquired.

Assuming now that the device data of the control appliance 4 at a certain time is such data as indicated in FIG. 6, the acquired data 1 are "83, 78, 48, 49, 50, 49"; the acquired data 2 are "2, 3456"; and the acquisition data 3 are "76, 5432".

At a step S41, the field "acquisition type " of "i" being equal to the record No. of the acquiring data table 132*c* of the setting data file 132 is derived, and then is converted into such an acquisition type to which the acquisition data has been set.

In the setting data file 132 of FIG. 3, since the record No. 1 is the "text", the acquired device data "83, 78, 48, 49, 50, 49" are converted into "SN0121" in accordance with the ASCII code. Since the record No. 2 is the "integer", the acquired device data "2, 3456" are converted into a single integer "23456". Since the record No. 3 is the "integer", the acquired device data "76, 5432" are converted into a single integer "765432".

At a step S42, the field "storage type" of "i" being equal to the record No. of the acquiring data table 132*c* of the setting data file 132 is derived, and the data converted into the acquisition type is converted into the storage type under setting.

In the setting data file 132 of FIG. 3, since the record No. 1 is the "text", the data is converted into "SN0121"; since the record No. 2 is the "integer", the data is converted into "23456"; and since the record No. 3 is the "real number", the data is converted into "$7.65432 \times 10^5$".

At a step S43, the field "processing formula" of "i" being equal to the record No. of the acquiring data table 132*c* of the setting data file 132 is derived, and the data converted into the storage type is processed in accordance with the set four basic arithmetic calculations.

In the setting data file 132 of FIG. 3, since both the record No. 1 and the record No. 2 are "none", no data processing operation is carried out, and the data are equal to "SN0121" and "23456", respectively. Since the record No. 3 is equal to "÷1000", such a calculation "$7.65432 \times 10^5 \div 1000$" is carried out, so that the data becomes "$7.65432 \times 10^2$".

At a step S44, the field "acquisition data name" of "i" be equal to the record No. of the acquiring data table 132*c* of the setting data file 132 is derived, and the processed acquisition data is stored into the field of the storage file corresponding to the acquisition data name under setting.

In the setting data file 132 of FIG. 4, the record No. 1 stores the data "SN0121" into the field name "product number" of the storage file; the record No. 2 stores the data "23456" into the field name "production completion number" of the storage file; and the record No. 3 stores the data "$7.65432 \times 10^2$" into the field name "measurement value" of the storage file.

Subsequently, at a step S45, "1" is added to the variable "i".

At a step S46, a check is made as to whether or not the variable "i" is larger than the acquired data number. If the variable "i" is not larger than the acquired data number, then the process operation is again returned to the step S40. If the variable "i" is greater than the acquired data number, then the process operation is advanced to a step S47.

At the step S47, a check is done as to whether or not a signal used to accomplish the data acquisition is entered by the keyboard 3. If this signal is inputted, the process operation jumps to the step S41 at which the data acquisition is accomplished. Conversely, if this signal used to complete the data acquisition is not inputted, the process operation is returned to the step S37 at which the process operation is repeated from the data acquisition for the trigger condition.

In accordance with this embodiment, the storage file used to store the data can be formed in the interactive manner by the simple operation, so that since the complex program is no longer required to be formed by the user himself, the programming work condition could be improved.

Also, the trigger condition can be easily changed and the setting operation of the storage file can be readily modified. Therefore, the desired storage file can be readily formed without having knowledge about the device of the control appliance 4.

Even when the station number of the control appliance 4 from which the data should be acquired is changed, and also the control appliance itself is changed, the resetting operation can be easily performed without reforming the program.

Furthermore, the format stored in the storage file can be freely set by the user, and the data necessary to the user can be derived in such a useful format easily understood by the user, so that the data readily utilized to manage the production can be easily obtained.

Also, the operator can readily set the field of the storage file, and also which data (namely, data derived from which control appliance, and which device, and also how much data is derived) is acquired in this field, while establishing a relationship between them.

(Embodiment 2)

Referring now to FIG. 9 to FIG. 16, a data describing/writing method according to an embodiment of the present invention will be described.

Figure 9:
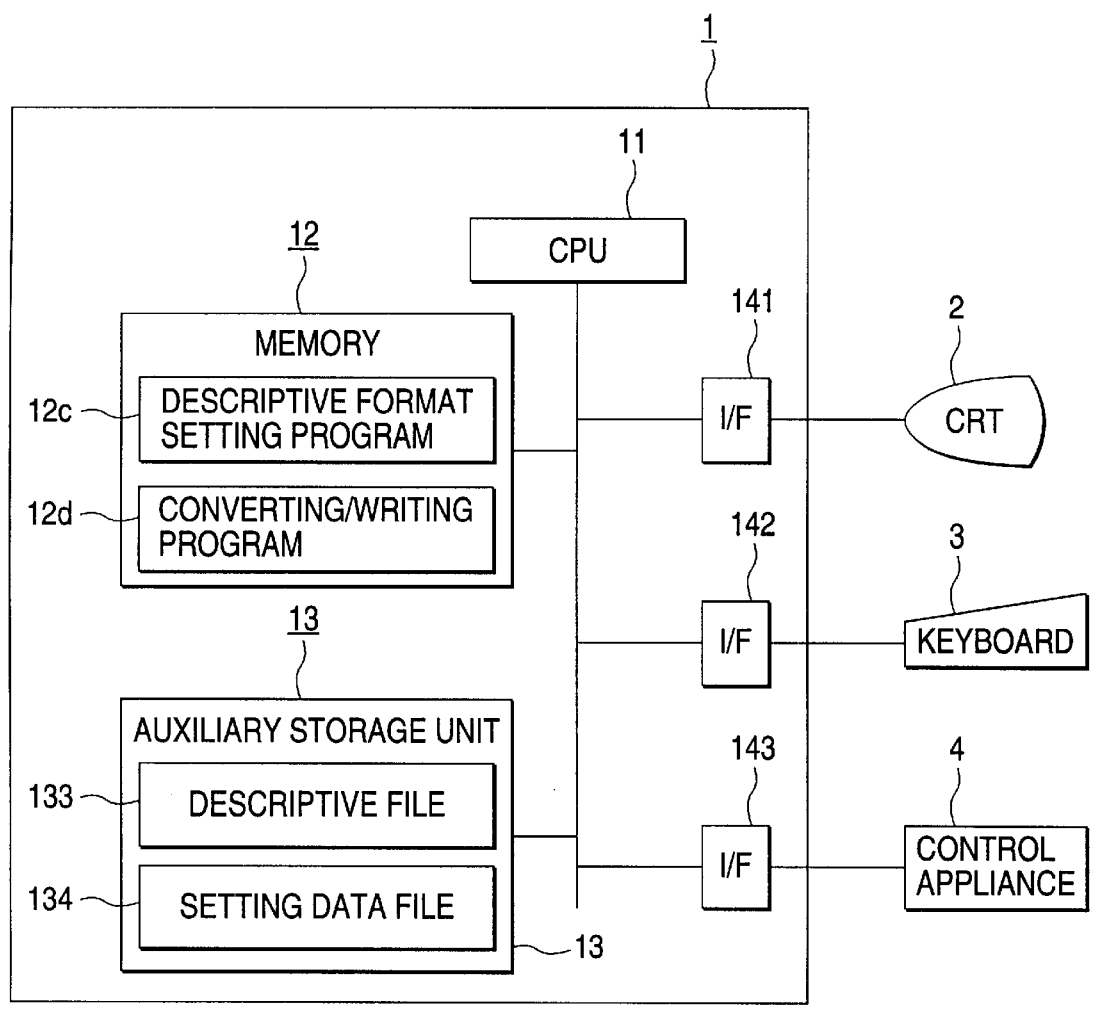
FIG. 9 is a block diagram showing a function of a data describing/writing apparatus according to an embodiment of the present invention.

FIG. 9 is a block diagram for representing an arrangement of a data describing/writing apparatus according to an embodiment of the present invention. In this drawing, reference numeral 1 shows a control apparatus (controller) for controlling an appliance connected thereto. To this controller 1, a CRT2 functioning as a display unit, a keyboard 3 functioning as an input unit, and a control appliance 4 containing a plurality of PLCs and a plurality of PCs are connected.

Within the controller 1, there are provided a CPU11 for executing a user application program and a program such as a preset control program, a memory 12 for storing the user application program and the preset control program, an auxiliary storage unit 13 having a descriptive file 133 with a database format which describes data written into the control appliance 4, and also having a setting data file 134 for storing therein a descriptive format of this descriptive file 133, an interface 141 for interfacing to the CRT2, another interface 142 for interfacing to the keyboard 3, and also a further interface 143 for interfacing to the control appliance 4.

It should be noted that the control program stored in the memory 12 contains a descriptive format setting program 12c and a converting/writing program 12d. The descriptive format setting program 12c capable of setting a desired descriptive format of the descriptive file 133 by employing the keyboard 3 and a mouse by an operator in an interactive manner displayed on the CRT2. The converting/writing program 12d corresponds to a writing means for storing therein a data converting method, and a data writing method.

Figure 10:
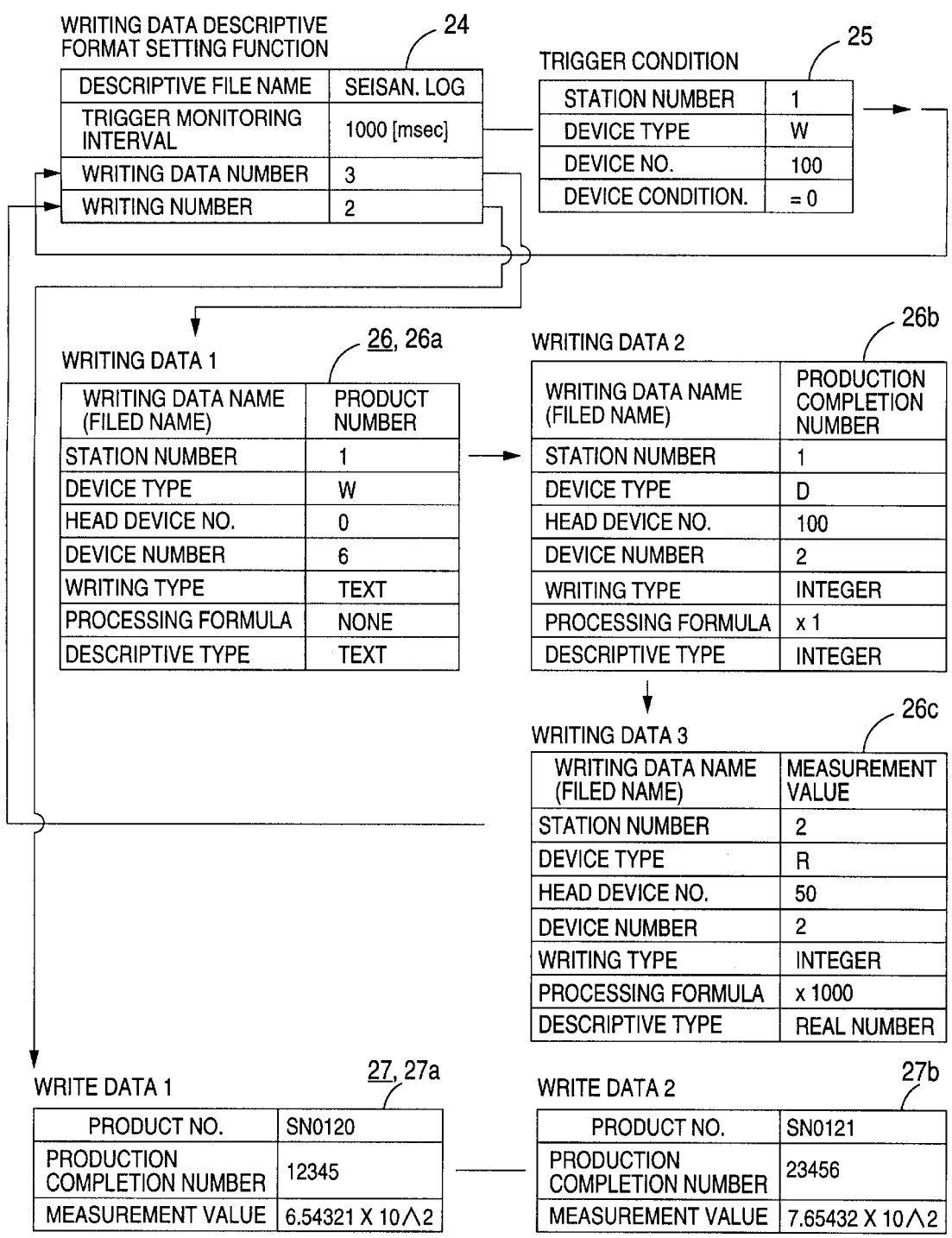
FIG. 10 is a screen arrangement diagram showing a screen arrangement of a display screen displayed on a CRT based upon a descriptive format setting program.

FIG. 10 schematically shows a screen arrangement for representing a display screen of the CRT2 displayed on a descriptive format setting program 12c.

In this drawing, reference numeral 24 indicates a main display screen. On this main display screen 24, a file name of the descriptive file 133 set into the auxiliary storage unit 13; a trigger monitoring interval of a trigger condition for writing the data into the control appliance 4, and the writing data number, and the writing time are set. Reference numeral 25 indicates a trigger condition setting screen. A station number, a device type, the number of this device, and a device state, constituting a trigger condition used to write the data, are set on this trigger condition setting screen 25.

Reference numeral 26 shows a descriptive format setting screen used to set the descriptive format. On this descriptive format setting screen 26, the following items are set, namely, a writing data name for designating a name of data to be written; a station number of the control appliance 4 into which the data should be written; a device type; and a head device number for designating which device is started within the device type. Furthermore, there are a device number for designating how many device data are written from the head device No.; an writing type for designating a type of writing device; a process formula for setting how to process the writing data based upon a formula using the four basic arithmetic operations; and a writing format for designating a format used when the processed data is described. Reference numerals 26a, 26b, 26c are screens for setting data to be written in response to the writing data number set on the main display screen 24.

Reference numeral 27 indicates a screen used to set the writing data to be written into the control appliance 4. Reference numerals 27a and 27b show screens used to set write data 1 and write data 2 in response to the writing times set on the main display screen 24.

FIG. 11 is a conceptional diagram for showing a setting data file 134 for storing data indicative of the descriptive format of the descriptive file 133 set in the interactive manner (see FIG. 10). In this drawing, reference numeral 134a shows a main table for indicating the content set on the main display screen 24, reference numeral 134b is a trigger condition table for showing the content set on the trigger condition setting screen 25, and reference numeral 134c is a writing data table for showing the content set on the descriptive format setting screen 26.

FIG. 12 is a diagram for representing, for instance, the descriptive file 133 formed in accordance with this embodiment. The descriptive file 133 is formed such that the writing data number is selected to "3", and the writing data name of this data to be written is "product number", "production completion number", and "measurement value".

FIG. 13 is such a diagram for indicating a condition of the descriptive file 133 for the data written when the data is actually coincident with the trigger condition in accordance with this embodiment.

FIG. 14 is a diagram for indicating such device data that the writing data of the descriptive file 133 formed by, for instance, this embodiment is written into the control appliance in accordance with the content of the setting data file 134.

Figure 15:
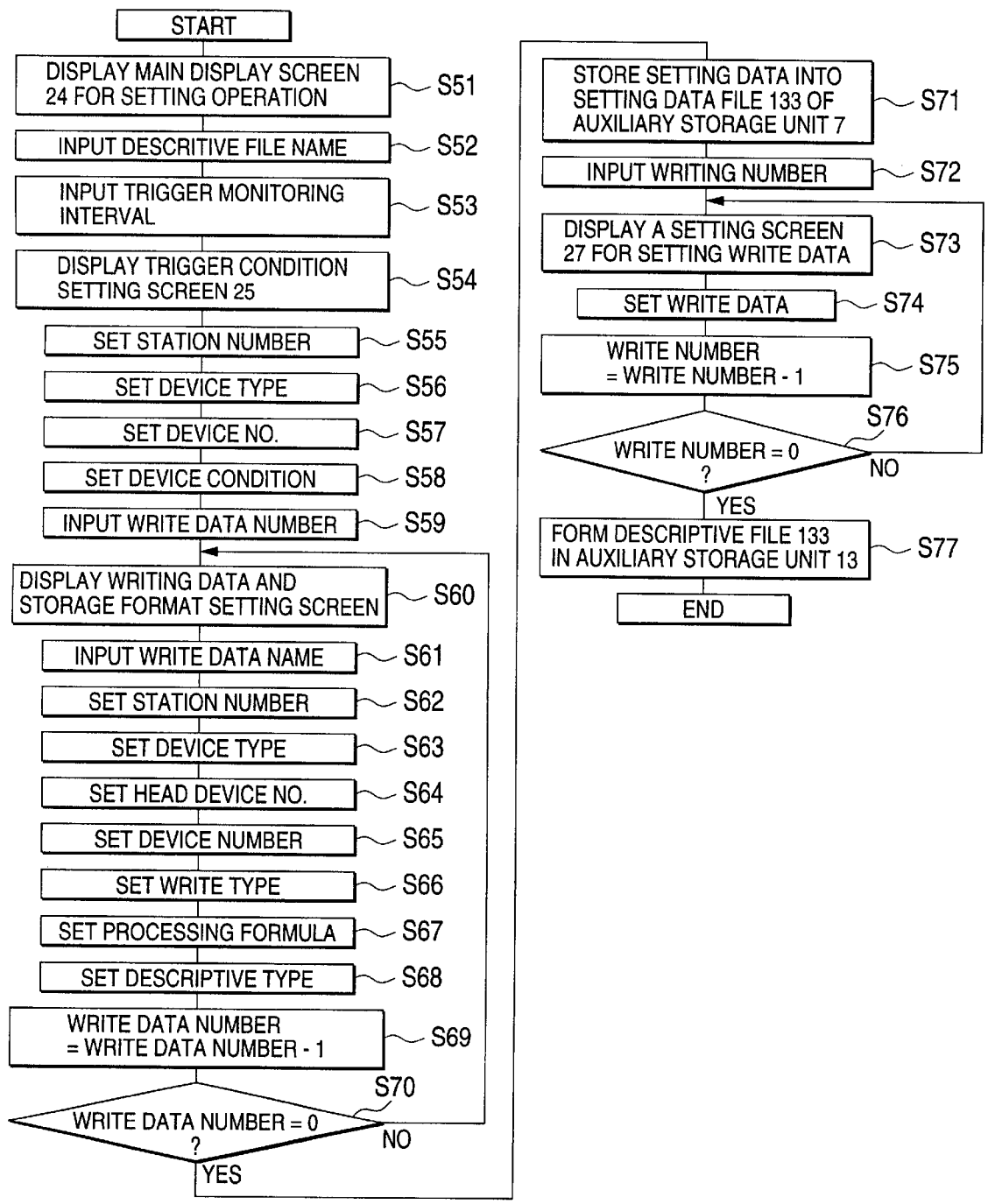
FIG. 15 is a flow chart showing operations when an operator sets a descriptive format of a descriptive file in an interactive manner.

FIG. 15 is a flow chart for describing operations when an operator sets the descriptive format of the descriptive file 133 in the interactive manner based on the descriptive format setting program 12c previously stored in the memory 12. The setting data file 134 is fabricated in accordance with a series of flow operation defined in this flow chart.

Figure 16:
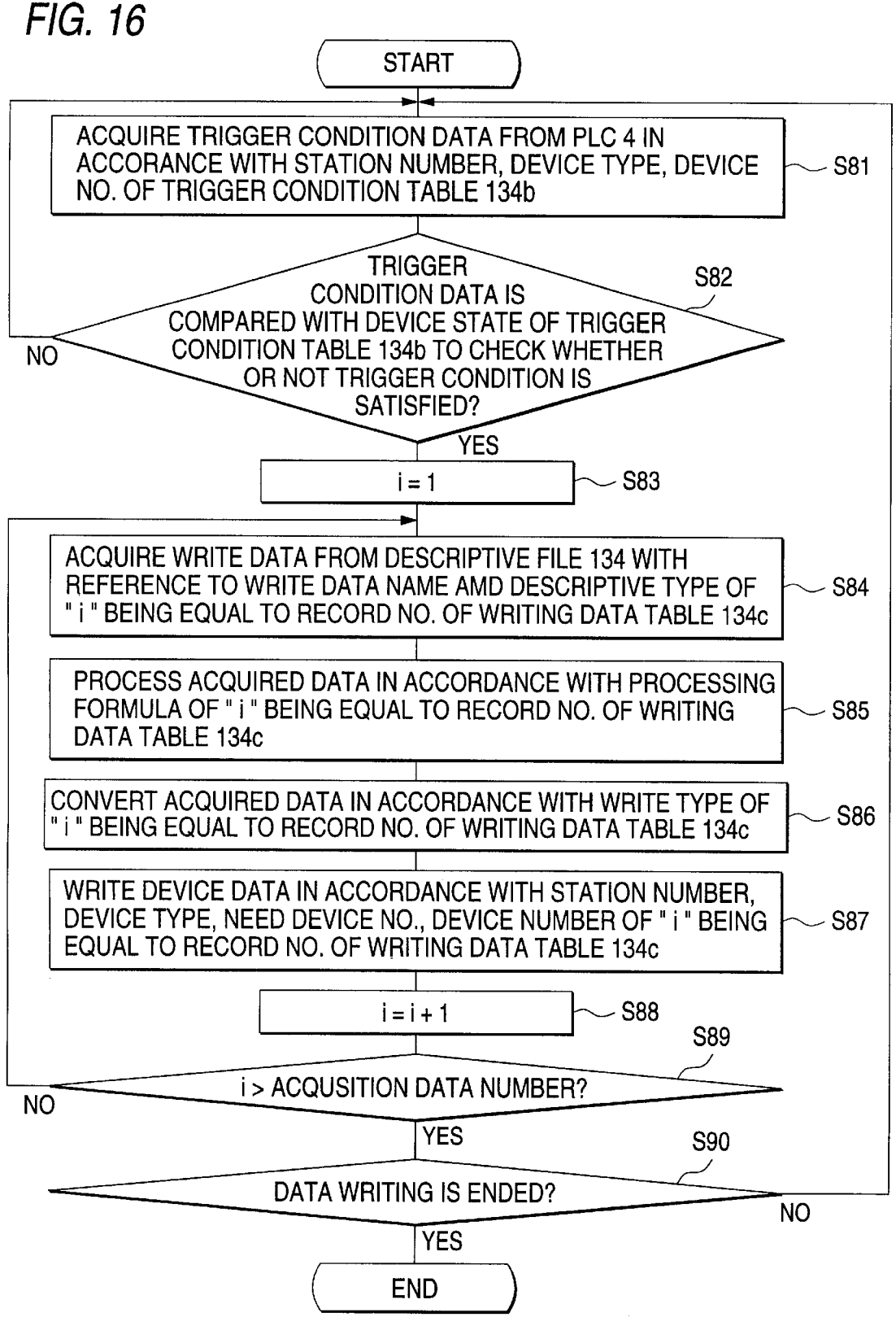
FIG. 16 is a flow chart representing operations when data is writing into a control appliance based upon a setting data file and a converting/writing program.

FIG. 16 is another flow chart for describing operations when the data is written into the control appliance 4 based upon the setting data file 134 and the converting/writing program 12d. The descriptive file 133 is produced by executing a series of flow operations defined in this flow chart.

Referring now to drawings, operations of this embodiment 2 will be explained.

A conceptional operation executed by the CPU 11 will now be described with reference to FIG. 1.

The operator sets (inputs) a desirable descriptive format of the descriptive file 131 by operating the keyboard 3 in the interactive manner based upon the descriptive format setting program 12c (see FIG. 10).

Then, these descriptive formatted data are saved in the database type setting data file 134 stored in the auxiliary storage unit 13 (see FIG. 10).

Furthermore, the database formatted descriptive file 133 used to describe the data to be written into the control appliance 4 is formed in the auxiliary storage unit 13 (see FIG. 13).

Thereafter, referring now to the converting/writing program 12d and the setting data file 132, the writing data which has been stored in the descriptive file 133 of the auxiliary storage unit 13 is acquired. After the acquired data has been converted based on the descriptive format, the converted data is written in the device of the control appliance 4 set for the writing operation (see FIG. 14).

Next, a detailed explanation is made of a method for writing/describing subject data of the controller 1.

In the flow chart of FIG. 15, when the operator first initiates the controller 1 by way of the keyboard 3, the main display screen 24 is displayed on the CRT2 at a step S51 in order to set the writing data/descriptive format shown in FIG. 10.

On the displayed main display screen 24, the file name for describing the writing data is inputted (step S52). This corresponds to "SEISAN.LOG" on the main display screen 24 of FIG. 10. Then, the trigger monitoring interval is inputted (step S53). This corresponds to "1000" on the main display screen 24.

When the entries of the descriptive file name and the trigger monitoring interval have been accomplished on the main display screen 24, the process operation is advanced to a step S54 at which the screen of the CRT2 is switched into the trigger condition setting screen 25 used to set the trigger condition.

Then, a station number of the control appliance 4 is set which constitutes the trigger for acquiring the data from a plurality of control appliances 4 (step S55). A device type of the set control appliance 4 is set (step S56). A device number of this device is set (step S57), and furthermore a device condition thereof is set (step S58).

It should be noted in this embodiment that the station number is "1", the device type is "W", the device number is "100", and the device condition is "=0".

In other words, this trigger condition implies that this trigger condition can be satisfied when the value of the number 100 of the device type W for the station number 1 of the control appliance 4 becomes 0.

When the entry of the trigger condition is accomplished on the trigger condition setting screen 25 displayed on the CRT2, the display condition is again returned to the main display screen 24, at which the data number to be written is entered (step S9). This corresponds to "3" on the main display screen 24 of FIG. 11.

When the entry of the writing data number on the main display screen 24 is accomplished, this main display screen 24 on the CRT2 is changed into the descriptive format setting screen 26 used to set the descriptive format of the writing data (step S60). In this case, since the writing data number is selected to be "3", there are three setting operations of the writing data.

On the descriptive format setting screen 26, a screen 26a used to set the first writing data is displayed, and then the writing data 1 is set. A writing data name for designating a name of writing data is set (step S61), a station number of a control appliance 4 into which data should be written is set (step S62), and a device type is set (step S63). A head device No. for designating that the set device is started from which device within the device types is set (step S64), a device number for designating how many device data is acquired from the head device No. is set (step S65), a writing type for designating a type of a device to be written is set (step S56), a processing formula is set which sets how to process the writing data based on the formula with employment of the four basic arithmetic operations (step S67), and further, a type of description for designating a type when the written data is described is set (step S68).

As to the writing data 1, the writing data name is "product number"; the station number is "1"; the device type is "W"; the head device No. is "0"; the device number is "6"; the writing type is "text"; and the processing formula is "none" which represents that the data is not processed. Furthermore, the processing formula is "text".

In this case, the data 1 to be written implies that such data are written in the text type from the head device No. being "0" of the device type W of the control appliance station number 1 up to six devices, namely from W0 to W5, and then these data are stored in the text type at the product number to which the field name of the descriptive file 133 belongs.

At a next step S69, the writing data number is subtracted by 1 and the process operation is advanced to a step S70.

At this step S70, a check is done as to whether or not the writing data number "3" set on the main display screen 24 of FIG. 10 becomes "0".

If the writing data number set at this step is not equal to 0, then the process operation is returned to the step S60 at which the screen 26b for setting the second writing data 2 is displayed. As to the acquiring data 2, the setting operations from the step S61 to the step S68 are carried out in a similar manner to the above-described acquiring data 1.

Furthermore, this setting operation is similarly performed to the data to be written 3.

The data 2 to be written implies that such data are acquired in the integer type from 100 of the head device No. of the device type D for the control appliance station number 1 to two devices, namely D100 and D101, and then these data are stored in the integer type at which the field name of the descriptive file is the production accomplished number. Furthermore, the data to be written 3 implies that such data are acquired in the integer type from 50 of the head device No. of the device type R for the control appliance station number 2 to two devices, namely R50 and R51, and then these data are multiplied by 1000, and thereafter, the multiplied data are stored in the real number type at which the field name of the descriptive file is the measurement value.

When the set writing data number becomes 0 at the step S70, the process operation is advanced to a step S71 at which the set writing data/descriptive type data is saved in the database type set data file 134 (shown in FIG. 11) within the auxiliary storage unit 13.

Next, the writing number is inputted at a step S72. This corresponds to "2" on the main display screen 34 of FIG. 10.

At a step S73, a screen 27a used to set the write data 1 on the CRT2 is displayed, and the writing data 1 is entered at a step S74. This corresponds to "SN0120", "12345", and "6.54321×10A2" on the screen 27a used to set the writing data 1 of FIG. 10.

At the next step S75, the writing number is subtracted by 1, and a check is made at a step S76 as to whether or not the writing number becomes 0.

If the set writing number is not equal to 0, then the process operation is returned to the step S73 at which the screen 27b used to set the second writing data 2 is displayed. As to the writing data 2, a setting operation of a step S74 is carried out in a similar manner to the case of the writing data 1. When the writing number becomes 0, then the set writing data is used to form the database type descriptive file 133 within the auxiliary storage unit 13 at a step S327. Then at a step S78, the setting operation is ended to erase the input screen.

It should be noted that the contents of the database type setting data file 134 shown in FIG. 11 correspond to the data set from the display screen used to set the writing data/descriptive format shown in FIG. 10 in an one-to-one correspondence.

The data set on the main display screen 24 is saved in the trigger condition table 134a of FIG. 11, the data set on the trigger condition setting screen 25 is saved in the trigger condition table 134b of FIG. 11, and also the data set on the writing data setting screen 26 is saved in the writing data table 134c of FIG. 11.

Referring now to a flow chart of FIG. 16, a method for writing the data into the control appliance 4, executed by the controller 1, will be explained in detail.

First, when the operator initiates the controller 1 via the keyboard 3 after the writing data/descriptive format has been set, the CPU11 derives a field "station number", a "device type", and a "device No." of the trigger condition table 134b of the setting data file 134 within the auxiliary storage unit 13, and then acquires the data for trigger condition from the control appliance 4 in response to the set data at a step S81. This implies that in the setting data file 134 of FIG. 11, the device data about the station number "1", the device type "W", and the device No. "100" are acquired.

At a step S82, the field "device condition" of the setting data file 134 is derived and is compared with the acquired data for the trigger condition in order to check whether or not the trigger condition can be satisfied. Since the device condition is equal to "0" in the setting data file 134 of FIG. 11, another check is done as to whether or not the acquired data for the trigger condition,is equal to "0". When the trigger condition cannot be satisfied, the process operation is returned to the step S81 at which the data acquisition for the trigger condition is continued. In the case that the trigger condition can be satisfied, the initial value 1 is substituted for the variable "i".

At a step S84, the "writing data name" and descriptive type corresponding to "i" equal to the record No. of the writing data tale 134c of the writing data file 134 are derived, and the writing data from the descriptive file 133 is acquired in accordance with the set data.

For instance, in the setting data file 134 of FIG. 11, since the "writing data name" of the record No. 1 is the "product number" and the descriptive type is the "text", assuming now that the value of the descriptive file 133 to be referred at a certain time instant is shown in FIG. 13, the "product number" is acquired by the "text" data to obtain "SN0121".

In the record No. 2, the "production completion number" is acquired as the "integer" data to obtain "23456".

In the record No. 3, the "measurement value" is acquired as the "real number" data to obtain "$7.65432 \times 10^{\wedge}2$".

At a step S85, the field "processing formula" of "i" being equal to the record No. of the writing data table 134c of the setting data file 134 is derived, and the data acquired by the descriptive type is processed in accordance with the set four basic arithmetic calculations.

In the setting data file 134 of FIG. 11, since both the record No. 1 and the record No. 2 are "none", no data processing operation is carried out, and the data are equal to "SN0121" and "23456", respectively. Since the record No. 3 is equal to ×1000, such a calculation "$7.65432 \times 10^{\wedge}5 \times 1000$" is carried out, so that the data becomes "$7.65432 \times 10^{\wedge}5$".

At a step S86, the "writing type" of "i" be equal to the record No. of the writing data table 134c of the setting data file 134 is derived, and the processed acquisition data is converted into the set writing type.

In the setting data file 134 of FIG. 11, since the record No. 1 is the "text", "SN0121" is converted into device data "83, 78, 48, 49, 50, 49" in accordance with the ASC II code.

Since the record No. 2 is the "integer", the data is converted into "2, 3456", and since the record No. 3 is the "integer", the data is converted into "76, 5432".

At a step S87, the "station number", the "device type", the "head device No.", and the "device number" corresponding to "i" equal to the record No. of the writing data table 134c of the setting data table 134 are derived, and then the writing data which has been converted in accordance with the set data is written (see FIG. 14).

Subsequently, at a step S88, "1" is added to the variable "i".

At a step S89, a check is made as to whether or not the variable "i" is larger than the acquired data number. If the variable "i" is not larger than the acquired data number, then the process operation is again returned to the step S84. If the variable "i" is greater than the acquired data number, then the process operation is advanced to a step S90.

The device data of the control appliance 4 at the time when the writing data have been written with respect to all of the record numbers are illustrated in FIG. 14.

At the step S90, a check is done as to whether or not a signal used to accomplish the data writing operation is entered by the keyboard 3. If this signal is inputted, then the data acquisition is accomplished. Conversely, if this signal used to complete the data acquisition is not inputted, the process operation is returned to the step S81 at which the process operation is repeated from the data acquisition for the trigger condition.

In accordance with this embodiment, the descriptive file used to write the data can be formed in the interactive manner by the simple operation, so that since the complex program is no longer required to be formed by the user himself, the programming work condition could be improved.

Also, the trigger condition can be easily changed and the setting operation of the descriptive file can be readily modified. Therefore, the desired descriptive file can be readily formed without having knowledge about the device of the control appliance 4.

Even when the station number of the control appliance 4 into which the data should be written is changed, and also the control appliance itself is changed, the resetting operation can be easily performed without reforming the program.

Furthermore, the format written into the descriptive file can be freely set by the user, and the data necessary to the user can be derived in such a useful format easily understood by the user, so that the data readily utilized to manage the production can be easily obtained.

(Embodiment 3)

Referring now to FIGS. 17 to 21, a data retrieving/producing instruction method according to an embodiment of the present invention will be described.

Figure 17:
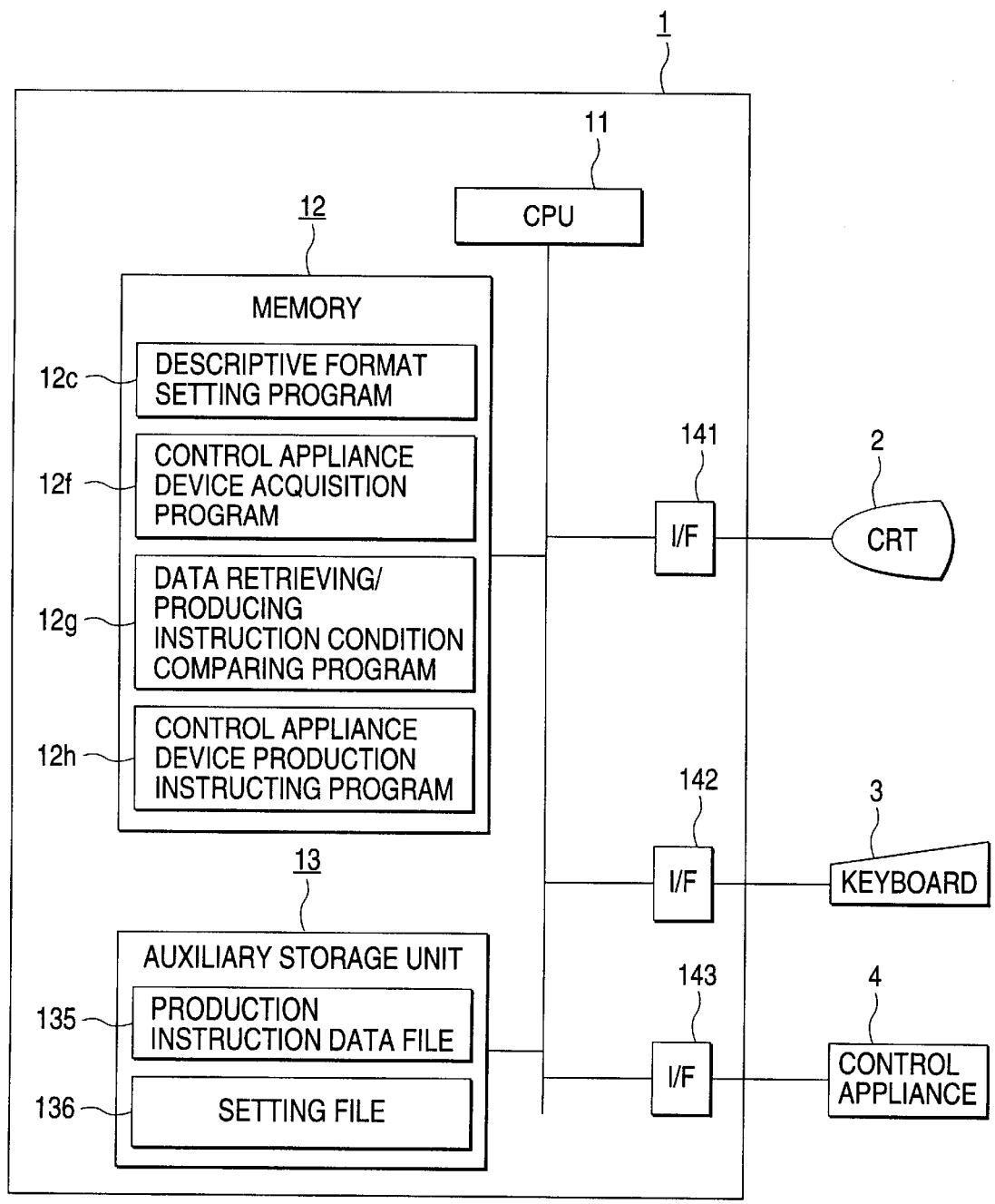
FIG. 17 is a block diagram showing an arrangement of a data processing apparatus having a data retrieving/production instruction function according to an embodiment 1 of the present invention.

FIG. 17 is a block diagram for representing an arrangement of a data processing apparatus having a data retrieving/ producing instruction function according to an embodiment of the present invention. In this drawing, reference numeral 1 shows a control apparatus (controller) for controlling an appliance connected thereto. To this controller 1, a CRT2 functioning as a display unit, a keyboard 3 functioning as an input unit, and a control appliance 4 containing a plurality of PLCs and a plurality of PCs are connected.

Within the controller 1, there are provided a CPU11 for executing a user application program and a program such as a preset control program, a memory 12 for storing the user application program and the preset control program, an auxiliary storage unit 13 having a production instruction data file 135 with a database format which saves data for instructing the production to the control appliance 4, and also having a setting data file 136 for storing therein the data of the production instruction data file 135, an interface 141 for interfacing to the CRT2, another interface 142 for interfacing to the keyboard 3, and also a further interface 143 for interfacing to the control appliance 4.

It should be noted that the control program stored in the memory 12 contains a data retrieving/producing instruction condition setting program 12e capable of setting a desired data retrieving/producing instruction by employing the keyboard 3 and a mouse by an operator in an interactive manner displayed on the CRT2. This control program further contains a control appliance device acquisition program 12f for acquiring retrieve device data used to derive the necessary data from the production instruction data file 135; a data retrieving/producing instruction condition comparing program 12g for retrieving/deriving record data corresponding thereto from the production instruction data file 135 based up the retrieve device data; and also a control appliance device production instructing program 12h for writing the derived record data such as the production instruction into the control appliance 4.

Figure 18:
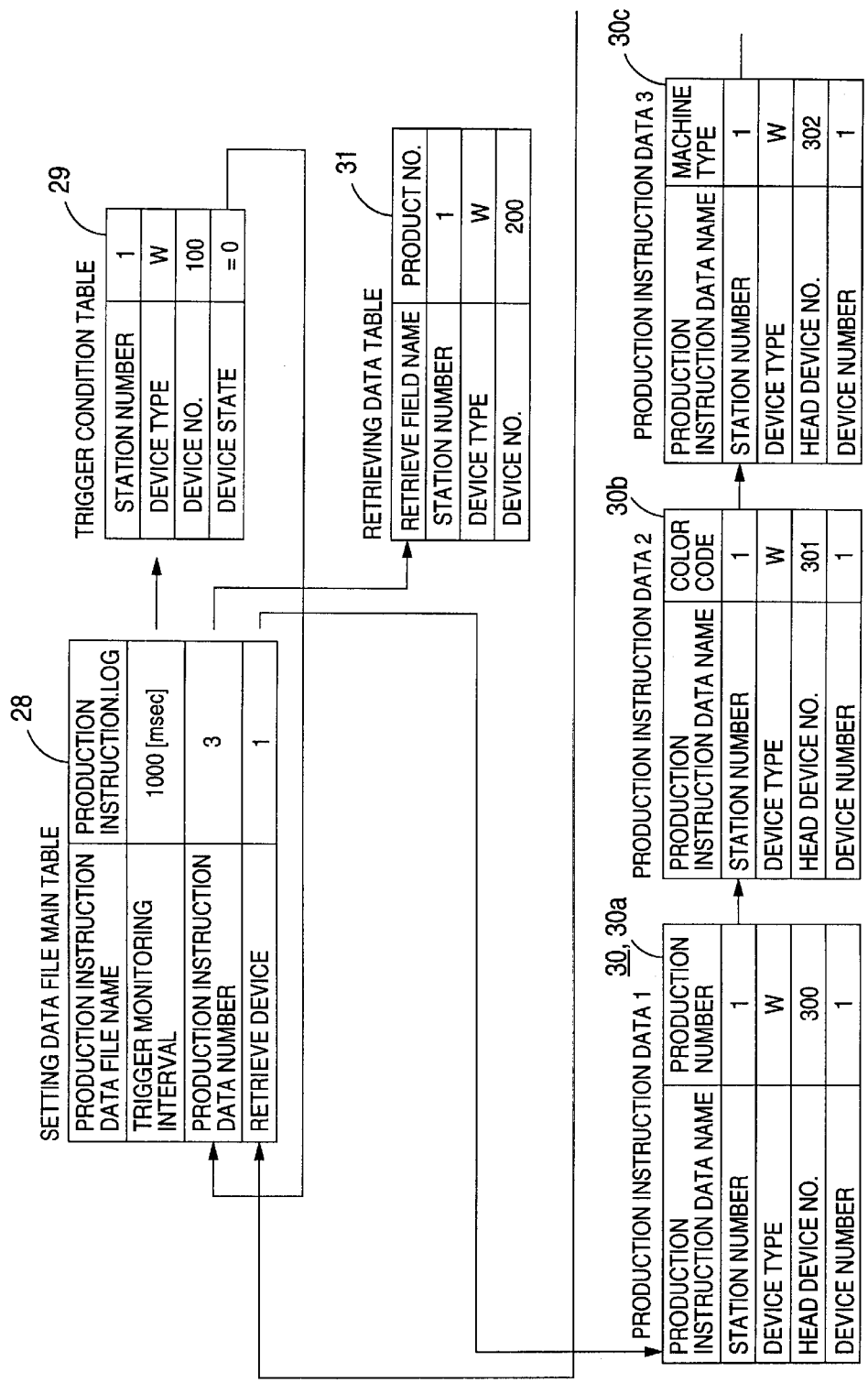
FIG. 18 is a screen arrangement diagram showing a screen arrangement of a display screen displayed on a CRT based upon a data retrieving/production instruction condition setting program.

FIG. 18 schematically shows a screen arrangement for representing a display screen of the CRT2 displayed on the data retrieving/producing instruction condition setting program 12e.

In this drawing, reference numeral 28 indicates a main display screen. On this main display screen 28, a file name of the production instruction data file 135 set into the auxiliary storage unit 13; a trigger monitoring interval corresponding to an interval used to monitor a trigger condition for giving the production instruction to the control appliance 4; the number of production instruction data; and also the number of retrieve device for acquiring the retrieving device data are set. Reference numeral 29 indicates a trigger condition setting screen. A station number, a device type, the number of this device, and a device state, constituting a trigger condition used to acquire the data, are set on this trigger condition setting screen 29.

Reference numeral 30 shows a screen used to set a write destination used when the data for instructing the production is written into the control appliance 4. On this writing format setting screen 30, the following items are set, namely, a data name for instructing the production; a station number of the control appliance 4 into which the data should be written; a device type; and a head device number for designating which device is started within the device type; and further a device number for designating how many device data are acquired from the head device No. Referring numerals 30a, 30b, 30c are screens for setting production instructing data in accordance with the number of production instruction data set on the main display screen 28.

Reference numeral 31 indicates a screen for setting a station number, a device type, and a device No. in order to acquire the retrieving device data from the control appliance 4.

FIG. 19 is a conceptional diagram for showing setting file 136 set in the interactive manner (see FIG. 18). In this drawing, reference numeral 136a shows a main table for indicating the content set on the main display screen 29, reference numeral 136b is a trigger condition table for showing the content set on the trigger condition setting screen 29, reference numeral 136c is a production instructing data table for showing the content set on the writing format setting screen 30, and reference numeral 136d indicates a retrieving data table for showing the content set on the retrieving data setting screen 31.

FIG. 20 is a diagram for representing, for instance, a previously formed production instruction data file 135, into which a production number, a producing quantity, a color code, and a machine type are set in correspondence with a record number.

Figure 21:
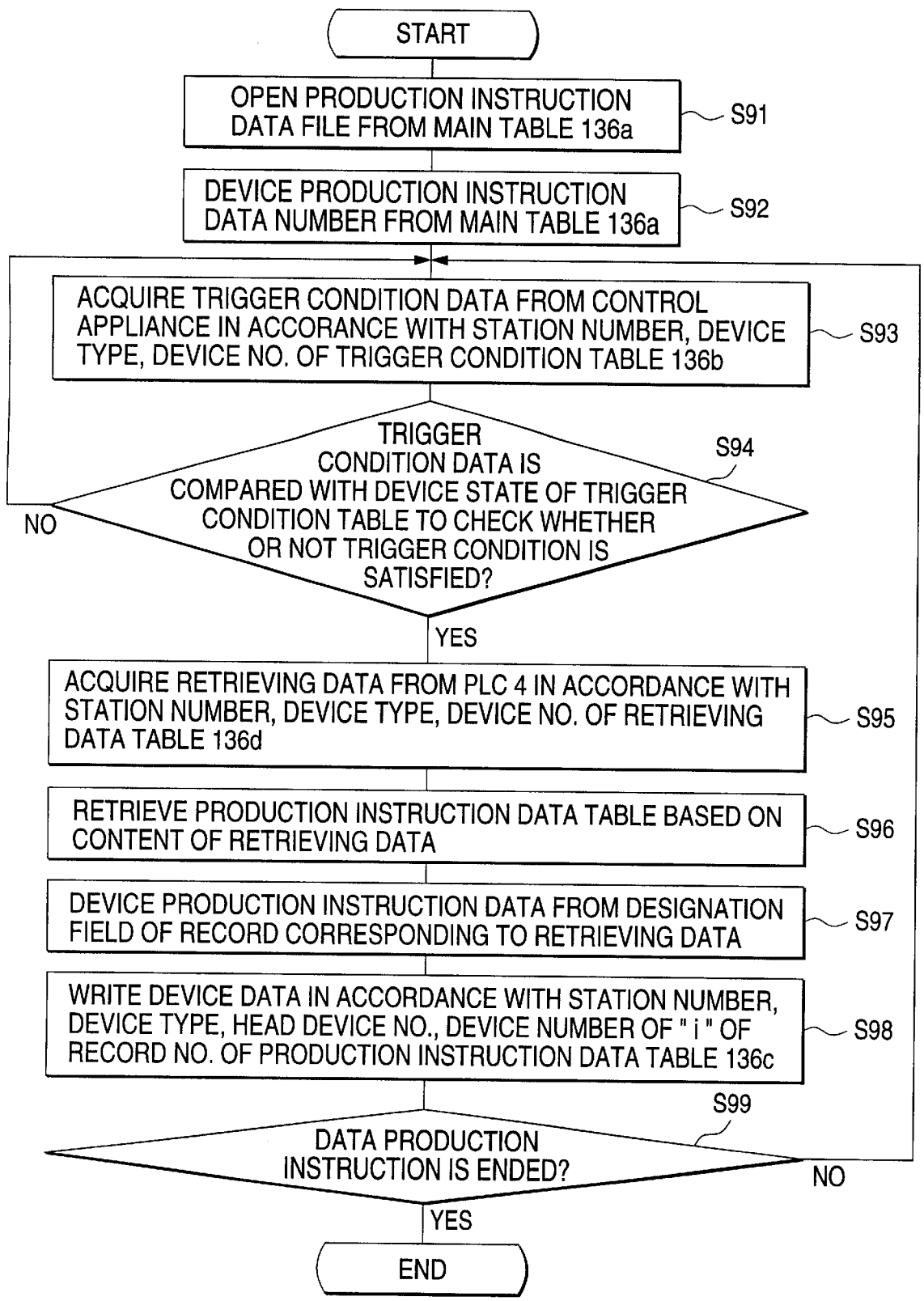
FIG. 21 is a flow chart indicating operation of a retrieving/production instruction function by a controller.

FIG. 21 is a flow chart for indicating operations of the retrieving/producing instruction function of the controller 1. A production is instructed to the control appliance 4 in accordance with a series of this flow operation.

Referring now to drawings, operations of this embodiment 1 will be explained.

A conceptional operation will now be described with reference to FIG. 17.

The operator sets (inputs) data for instructing a desirable data retrieval/production by operating the keyboard 3 in the interactive manner based upon the data retrieving/producing instruction condition setting program 12e (see FIG. 19).

Furthermore, the control appliance device acquisition program 127 will refer to the setting data file 136 stored in the auxiliary storage apparatus 13 so as to acquire the retrieving device data used to derive the necessary data from the production instruction data file (see FIG. 20) after the trigger condition could be satisfied.

Next, based upon the data retrieving/producing instruction condition comparing program 12g, the corresponding data is retrieved/derived from the production instruction data file 135 on the basis of the retrieving device data. Based upon the derived data, the data such as the production instruction is written into the control appliance 4 in accordance with the control appliance device production instructing program 12h.

Next, a detailed explanation is made of the data retrieving/producing instruction function of the controller 1.

Similar to the above-described embodiment 1 or 2, when the operator first initiates the controller 1 by way of the keyboard 3, the main display screen 28 is displayed on the CTR2. On this displayed main display screen 28, a file name of production instruction "production instruction LOG" and a trigger monitoring interval "1000" are inputted.

Thereafter, the screen of the CRT2 is switched into a trigger condition setting screen 29 for setting a trigger condition. The station number of the control appliance 4 for constituting the trigger condition is set as "1", a device type among the set control appliance 4 is set as "W"; a device number thereof is set as "100", and furthermore, a device condition thereof is set as "=0".

When the entry of the trigger condition on the trigger conditions setting screen 29 displayed on the CRT2 is accomplished, the display screen is returned to the main display screen 28 on which the production instruction data number "3" is inputted.

Then, the display screen is changed into another screen 30 through which the production instructing data corresponding to the production instruction data number "3" is set, and thus such a setting operation is firstly carried out as to the production instructing data 1. The production instructing data 1 becomes the production instructing data name "production quality", the station number "1", the device type "E", the head device No. "300", and the device number "1". The production instructing data 2 becomes the production instructing data name "color code", the station number "1", the device type "W", the head device No. "301", and the device number "1". The production instructing data 3 becomes the production instructing data name "machine type", the station number "1", the device type "W", the head device No. "302", and the device number "1".

Now, the production instructing data 1 implies that the data about "production quantity" is written into the station number "1" of the control appliance 4, the device type "W", the head device No. "300", and the device number "1".

Also, the production instructing data 2 implies that the data about "color code" is written into the station number "1" of the control appliance 4, the device type "W", the head device NO. "301", and the device number "1".

Furthermore, the production instructing data 3 implies that the data about "machine type" is written into the station number "1" of the control appliance 4, the device type "W", the head device No. "302", and the device number "1".

Thereafter, the display screen is returned to the main display screen 28 on which the number of retrieved device "1" is set. Then, both the conditions (station number "1", device type "W", device No. "200") used to acquire the retrieving device data corresponding to the retrieve device "1" from the control appliance 4, and also the retrieve field name for designating which field within the production instructing data file, from which the acquired retrieving device data is retrieved, are set on the subsequently switched screen 31.

The data set in the above-explained manner is saved in the setting data file 136 (see FIG. 19).

The production instruction data file 135 shown in FIG. 20 is previously inputted by the keyboard 3 or the like.

After the operator has accomplished setting of the above-explained data retrieve/production instructions, when the operator initiates the control appliance device acquisition program 12f via the keyboard 3, at a step S91, a production instruction data file name of the field of the main table 136a within the setting data file is derived, and then the production instruction data file 135 within the auxiliary storage unit 13 is opened, and thereafter the process operation is advanced to a step S92.

At this step S92, the field production instruction data number "3" of the main table 136a in the setting data file 136 is derived.

Then, at a step S93, the station number "1", the device type "W", and the device No. "100" of the trigger condition table 136b of the setting data file 136 are derived, and the data for the trigger condition is acquired from the control appliance 4 in accordance with this set data.

At a step S94, a comparison is made of the device condition "=0" of the data acquired from the control appliance 4 so as to check whether or not the trigger condition could be satisfied.

If this trigger condition could not be satisfied, then the process operation is returned to the step S93 at which the data for the trigger condition is continuously acquired.

After the trigger condition could be satisfied at the step S94, the retrieving device data is acquired from the control appliance 4 based upon the station number "1", the device type "W", and the device No. "200", which are set to the retrieving data table 136d at a step S95.

At a step S96, the production instruction data file 135 is retrieved based on the content of the acquired retrieving device data.

In this case, it is assumed that the content of the retrieving device data is "125".

The production instruction data file 135 shown in FIG. 20 is equal to the file "production instruction LOG" defined in the production instruction data file name of the main table 136a in the setting data file 136.

At a step S97, such a retrieve operation is carried out based on the retrieving device data "125" in that which record data in the production instruction data file may be handled as the production instruction data. In this embodiment, the retrieving device data corresponds to the field "product number" of the production instruction data file 135.

When the field "product number" is retrieved based on the retrieving device data "125", it is coincident with the record content of the record No. 4. Since it is coincident with the record content, the content of this record is recognized as the production instructing data, and then the content of the "production quantity (75)", the "color code (8)", and the "machine type (2)" subsequent to the field "product number" are derived.

At the next step S98, the previously derived data about the "production quantity (75)", the "color code (8)", and the "machine type (2)" are written into the control appliance 4 based on the production instructing data table 136c of the setting data file 136.

In FIG. 19, the "production quantity (75)" is written into the control device 4 of the station number "1", the device type "E", and the device No. "300". Also, the "color code (8)" is written into the control appliance 4 of the station number "1", the device type "W", and the device No. "301". The "machine type (2)" is written into the control appliance 4 of the station number "1", the device type "W", and the device No. "302" based upon the control appliance device production instruction program 12h.

At a step S99, a check is done as to whether or not a signal for accomplishing the data retrieving/producing instruction function is entered by the keyboard 3 and the like. If this signal is not inputted, then the data retrieving/producing instruction function is ended.

If such a signal for accomplishing the data retrieving/producing instruction function is not inputted, then the process operation is returned to the step S39 at which the above-described process is repeated.

In accordance with this embodiment, the data used to instruct the data retrieving/producing operation can be formed in the interactive manner by the simple operation, so that since the complex program is no longer required to be formed by the user himself, the programming work condition could be improved.

Also, the trigger condition can be easily changed and the setting operation of the descriptive file can be readily modified. Therefore, the desired data can be readily formed without having knowledge about the device of the control appliance 4.

Even when the station number of the control appliance 4 which may instruct the production, and also the control appliance itself is changed, the resetting operation can be easily performed without reforming the program.

(Embodiment 4)

Referring now to FIG. 22 to FIG. 25, a data writing method according to an embodiment of the present invention will be described.

Figure 22:
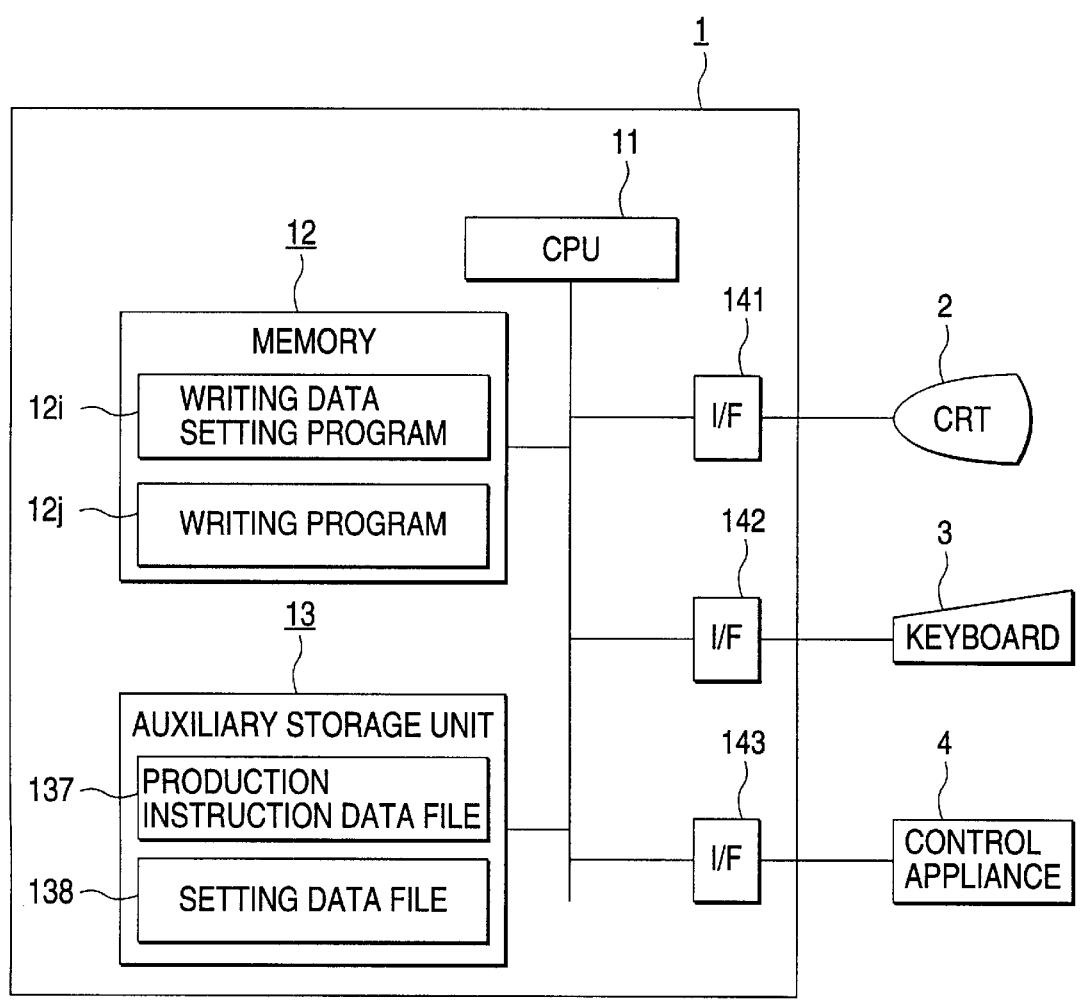
FIG. 22 is a block diagram indicating a function of a data writing apparatus according to an embodiment of this invention.

FIG. 22 is a block diagram for representing a function of a data processing apparatus according to an embodiment of the present invention. In this drawing, reference numeral 1 shows a control apparatus (controller) for controlling an appliance connected thereto. To this controller 1, a CRT2 functioning as a display unit, a keyboard 3 functioning as an input unit, and a control appliance 4 containing a plurality of PLCs and a plurality of PCs are connected.

Within the controller 1, there are provided a CPU11 for executing a user application program and a program such as a preset control program, a memory 12 for storing the user application program and the preset control program, an auxiliary storage unit 13 having a production instruction data file 137 with a database format which stores production instruction data written into the control appliance 4, and also having a setting data file 138 for storing therein setting data to be written into the control appliance 4, an interface for interfacing to the CRT2, another interface 142 for interfacing to the keyboard 3, and also a further interface 143 for interfacing to the control appliance 4.

It should be noted that the control program stored in the memory 12 contains a writing data setting program 12i and a writing program 121j. The writing data setting program 12i is capable of setting a condition to write desired production instruction data by employing the keyboard 3 and a mouse by an operator in an interactive manner displayed on the CRT2. The data writing program 121j stores therein a data writing method.

FIG. 23 schematically shows a setting data file 138 set in an interactive manner based on the writing data setting program. In this drawing, reference numeral 138a indicates a main table for indicating a content set on a main display screen; reference numeral 138b is a trigger condition table for showing a content set on a trigger condition setting screen; and reference numeral 138c is a writing data table for showing a content set on a descriptive format setting screen.

FIG. 24 is a diagram for representing a previously stored production instruction data file 135, in which "12345" is set to the product number, and "234567" is set to the production instruction number.

Figure 25:
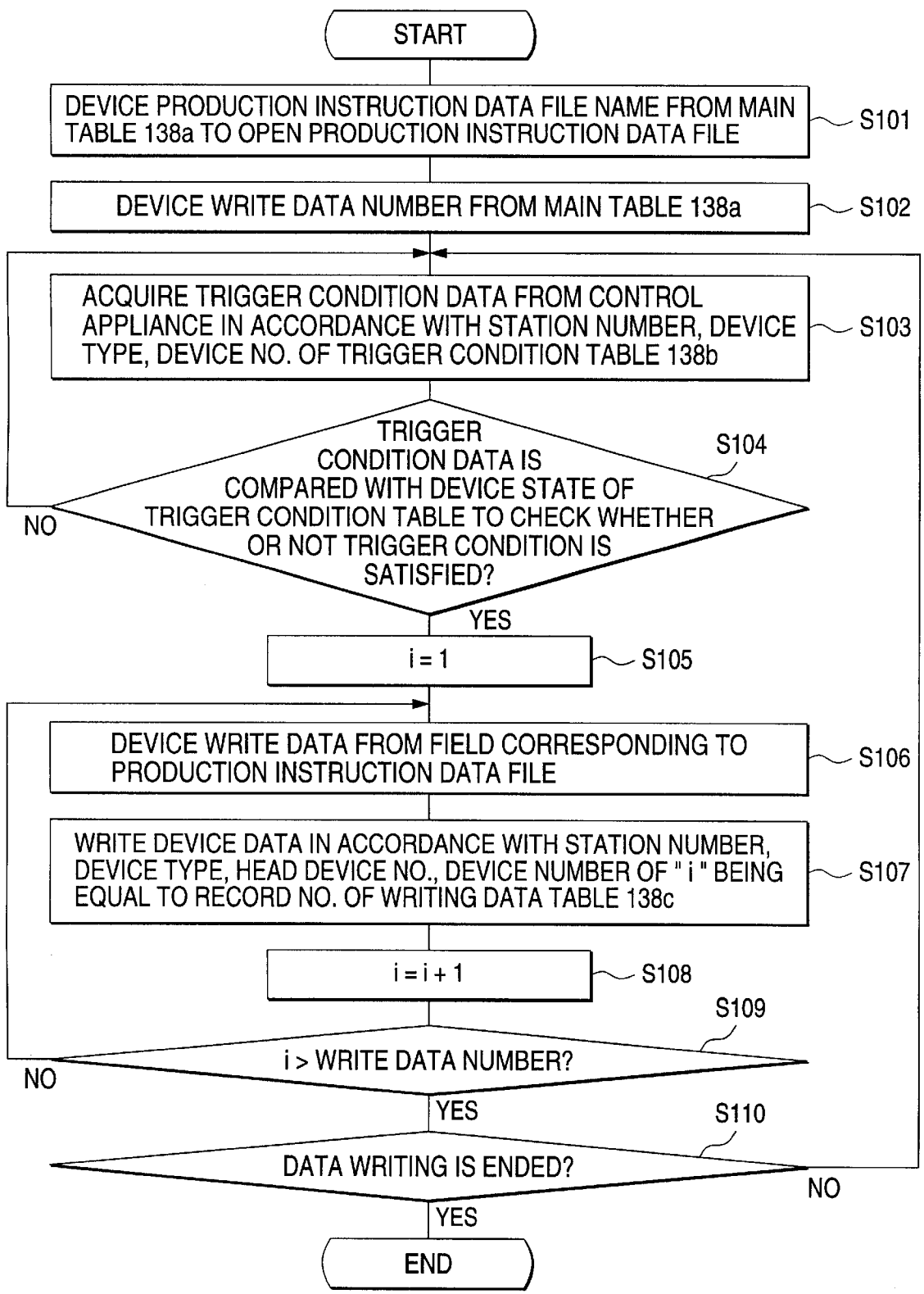
FIG. 25 is a flow chart for representing operations of the production instruction data writing function by a controller.

FIG. 25 is a flow chart for indicating operations of the production instruction data writing function executed by the controller 1. The production instruction is issued to the control appliance 4 according to a series of this flow operation.

Referring now to the drawing, operations of this embodiment 4 will be described.

Similar to the above-described embodiment 3, when an operator first initiates the controller 1 via the keyboard 3, the main display screen is displayed on the display screen of the CR2. On this displayed main display screen, a file name of production instruction data "START.DAT" and a trigger monitoring interval "1000" are inputted.

Thereafter, the screen of the CRT2 is switched into a trigger condition setting screen for setting a trigger condition. The station number of the control appliance 4 for constituting the trigger condition is set as "1"; a device type among the set control appliances 4 is set as "W"; a device number thereof is set as "100", and furthermore, a device condition thereof is set as "=0".

When the entry of the trigger condition on the trigger condition setting screen displayed on the CRT2 is accomplished, the display screen is returned to the main display screen on which the writing data number "2" is inputted.

Then, the display screen is changed into another screen through which the production instructing data corresponding to the writing data number "2" is set, and thus such a setting operation is firstly carried out as to the production instructing data 1. The writing data 1 becomes the writing data name "product number", the station number "1", the device type "W", the head device No. "0" and the device number "1". The writing data 2 becomes the writing data name "production instruction quantity", the station number "1", the device type "D", the head device No. "100", and the device number "2". These data set in accordance with the above-described manner are saved in the setting data file 138.

After the operator has accomplished setting of the above-explained writing data, when the operator initiates the controller 1 via the keyboard 3, at a step S101, a "production instruction data file name" of the field of the main table 138a within the setting data file 138 is derived in the auxiliary storage unit 13 based on the writing program 12j, and then the production instruction data file 137 within the auxiliary storage unit 13 is opened, and thereafter the process operation is advanced to a step S102.

At this step S102, the field "writing data number (3)" of the main table 138a in the setting data file 138 is derived.

Subsequently, at a step S103, the station number "1", the device type "W", and the device No. "100" of the trigger condition table 138b of the setting data file 138 are derived, and the data for the trigger condition is acquired from the control appliance 4 in accordance with this set data.

Then, at a step S104, the field "device condition (=0)" of the setting data file 138 is derived, and a comparison is made of the device condition "=0" of the data acquired from the control appliance 4 so as to check whether or not the trigger condition could be satisfied. If this trigger condition could not be satisfied, then the process operation is returned to the step S103 at which the data for the trigger condition is continuously acquired. To the contrary, if the trigger condition could not be satisfied, then an initial value "1" is substituted for the variable "i" at a step S105.

At the step S106, the field "writing data name" of "i" being equal to the "record No." of the writing data table 138c of the setting data file 138 is derived, and the production instruction data is read out from the field of the production instruction data file 137 corresponding to the set writing data name. In the setting data file 138 of FIG. 23, the record No. 1 reads 2-byte integer data "12345" equal to a product between 2-bytes of the device type W and the device number 1 from the field name "product number" of the production instruction data file, whereas the record No. 2 reads 4-byte integer data "234567" equal to a product between 2 bytes of the device type D and the device number 2 from the field name "production instruction quantity" of the production instruction data file (see FIG. 24).

At a step S107, the field "station number", the "device type", the "head device No.", and "the device number" of "i" equal to the record No. of the writing data table 138c corresponding to the production instruction data file 137 are derived, and the production instruction data is written into the control appliance 4 in accordance with the set data. In this embodiment, the record No. 1 writes the data into the station number "1", the device type "W", the head device No. "0", and the device number "1", whereas the record No. 2 write the data into the station number "1", the device type "D", the head device No. "100", and the device No. "2" (see FIG. 23).

At a step S108, "1" is added to a variable "i". At a step S109, a check is done as to whether or not the variable "i" is greater than the writing data number if the variable "i" is greater than the acquired data number, then the process operation is advanced to a step S110. Conversely, if the variable "i" is not greater than it, then the process operation is returned to the step S106.

At the step S110, another check is done as to whether or not a signal used to accomplish the data writing operation is entered by the keyboard 3. If such a signal is inputted, then the process operation jumps to a step S612 at which the data writing operation is ended. Conversely, if the signal used to end the data writing operation is not entered, the process operation is returned to the step S104 at which the data acquisition for trigger condition is repeated.

In accordance with this embodiment, the writing data used to instruct the production can be formed in the interactive manner by the simple operation, so that since the complex program is no longer required to be formed by the user himself, the programming work condition could be improved.

Also, the trigger condition can be easily changed and the setting operation of the descriptive file can be readily modified. Therefore, the desired data can be readily formed without having knowledge about the device of the control appliance 4.

Also, since the writing data is introduced into a client/server system, the data used in the respective client machines can be managed in the batch manner by sharing the data to the database server of the host machine.

(Embodiment 5)

Referring now to FIGS. 26 to 29, a data acquiring/storing method according to another embodiment of the present invention will be described.

Figures 26, 27, 28:
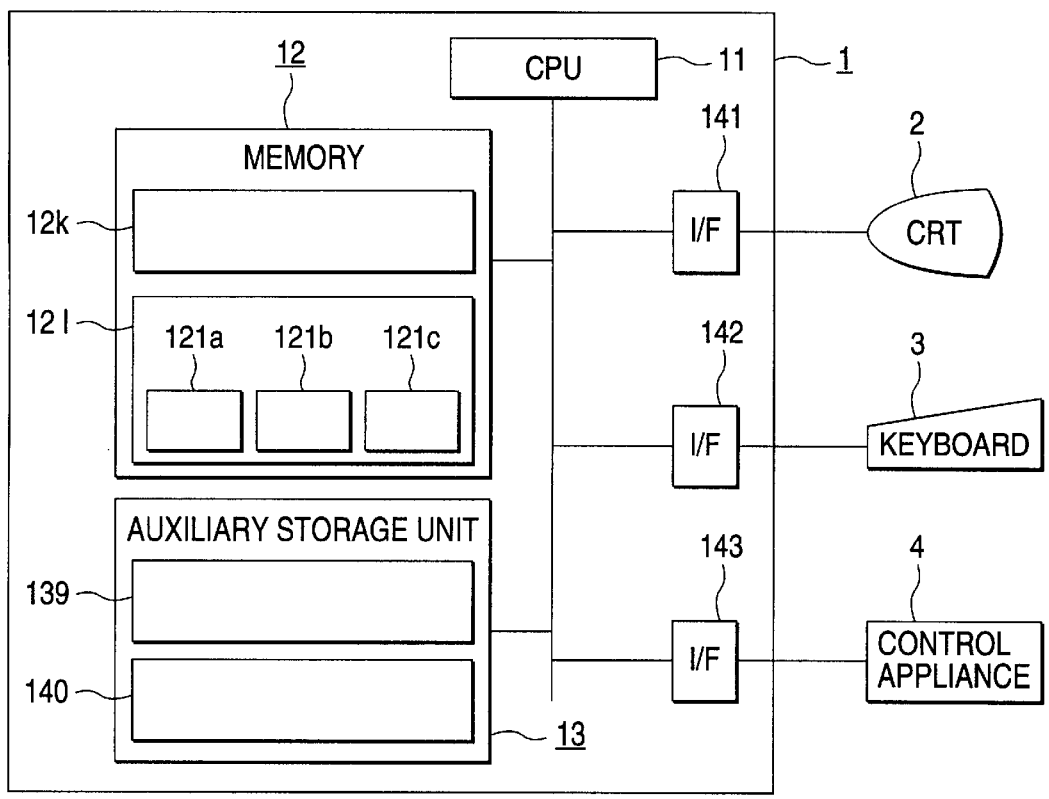
FIG. 26 is a block diagram showing an arrangement of a data processing apparatus having an acquisition/storage function according to another embodiment of the present invention.
FIG. 27 is a diagram indicating acquiring data set in an interactive manner based on a storage format setting program.
FIG. 28 is a file for storing accumulation time, elapse time, and numbers, obtained when device data acquired from a control appliance 4 formed inside a storage file 131 is made coincident with a predetermined comparison value.

FIG. 26 is a block diagram for representing an arrangement of a data processing apparatus having an acquisition/storage function according to an embodiment of the present invention. In this drawing, reference numeral 1 shows a control apparatus (controller) for controlling an appliance connected thereto. To this controller 1, a CRT2 functioning as a display unit, a keyboard 3 functioning as an input unit, and a control appliance 4 containing a plurality of PLCs and a plurality of PCs are connected.

Within the controller 1, there are provided a CPU11 for executing a user application program and a program such as a preset control program, a memory 12 for storing the user application program and the preset control program, an auxiliary storage unit 13 having a storage file 139 with a database format which stores data acquired from the control appliance 4, and also having a setting data file 140 for storing therein a storage format of the storage file 139, an interface 141 for interfacing to the CRT2, another interface 142 for interfacing to the keyboard 3, and also a further interface 143 for interfacing to the control appliance 4.

It should be noted that the control program stored in the memory 12 contains a storage format setting program and an acquisition/storage program 12k. The storage format setting program is capable of setting a desired storage format of the storage file 139 by employing the keyboard 3 and a mouse by an operator in an interactive manner displayed on the CRT2. The acquisition/storage program 12k is to store therein a data acquiring method, a data processing method, and a data storing method.

The memory 12 contains an accumulation time storage area 121a for storing accumulation time, an elapse time storage area 121b for storing elapse time when device data is coincident with a comparison value, and a number storage area 121c for storing the number when the device data is coincident with the comparison value, in order to store a history when the device data acquired from the control appliance 4 is made coincident with the comparison value corresponding to predetermined monitor comparison data.

FIG. 27 is a diagram for indicating acquiring data which has been set in an interactive manner based upon the storage format setting program and stored in a setting data file 140.

FIG. 28 represent a file used to store therein the accumulation time, the elapse time, and the number when the device data acquired from the control appliance 4 and formed in the storage file 139 is made coincident with a predetermined comparison value.

Figure 29:
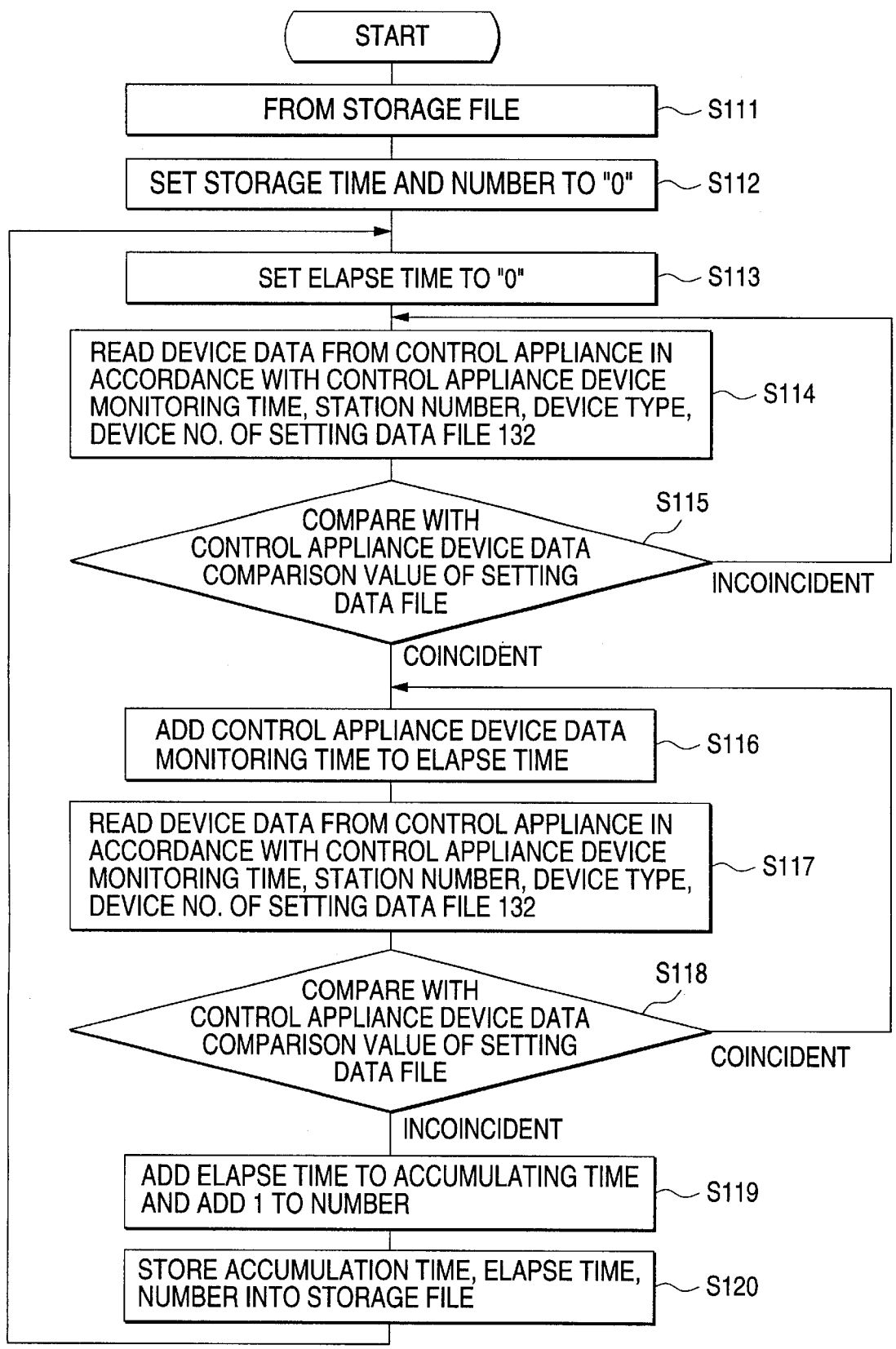
FIG. 29 is a flow chart representing operations when data from a control appliance is acquired based on a setting data file and an acquisition/storage program.

FIG. 29 is a flow chart for explaining operations when the data is acquired from the control appliance 4 based upon the setting data file 140 and the acquisition/storage program 12k. The storage file 139 is produced by performing a series of this flow operation.

The data acquisition/storage method by the controller 1 is identical to that of the above-explained embodiment 1. The set data to be acquired is saved in the setting data file 140 shown in FIG. 27.

The device data acquired from the control appliance 4 based on the acquisition/storage program 12k is stored in the storage file 139 within the auxiliary storage unit 13 (shown in FIG. 28).

Next, a description will be made of a method for acquiring data from the control appliance 4 executed by the controller 1.

When an operator initiates the controller 1 by the keyboard 3, the acquisition/storage program 12k stored in the memory 12 is commenced.

At a step S111, this acquisition/storage program 12k forms a database formatted storage file 139 for storing therein the data acquired from the control appliance 4 inside the auxiliary storage unit 13, and thereafter the process operation is advanced to a step S112.

At a step S112, the accumulation time of the accumulation time storage area 121a is set to "0", and the number storage area 121c is set to "0". Then, at a step S113, the elapse time of the elapse time storage area 32b is set to "0", and then the process operation is advanced to a further step S114.

At this step S114, "control appliance device monitoring interval", "station number", "device type", and "device No." are derived from the setting data file 132, and then the device data of the control appliance 4 is read in accordance with the set data.

Then, at a step S115, a comparison is made between the device data read at the step S114 and the control appliance device data comparison value stored in the setting data file 140. When the former device data is not coincident with the control appliance device data, the process operation is returned to the step S114.

On the other hand, when the read device data is compared with the control appliance device data comparison value stored in the setting data file 140, if this read device data is made coincident with this comparison value, then the process operation is advanced to a step S116, at which the control appliance device monitoring interval set in the setting data file 140 is added to the elapse time of the elapse time storage area 121b.

Thereafter, at a step S117, the "control appliance device monitoring interval", the "station number", the "device type", and the "device No." are derived from the setting data file 132, and then the device data of the control appliance 4 is read in accordance with the set data.

Then, at a step S118, a comparison is made between the device data read at the step S117 and the control appliance device data comparison value stored in the setting data file 140. When the former device data is not coincident with the control appliance device data, the process operation is returned to the step S116.

On the other hand, when the read device data is compared with the control appliance device data comparison value stored in the setting data file 140, if this read device data is not made coincident with this comparison value, then the process operation is advanced to a step S119, at which the elapse time of the elapse time storage area 121b is added to the accumulation time of the accumulation time storage area 121a, and "1" is added to the number of the number storage area 121c.

At a step S120, the accumulation time of the accumulation time storage area 121a, the elapse time of the elapse time storage area 121b, and the number of the number time storage area 121c are stored into the respective corresponding areas of the storage file 139 of the auxiliary storage unit 13.

In accordance with this embodiment, the storage file used to store the data can be formed in the interactive manner by the simple operation, so that since the complex program is no longer required to be formed by the user himself, the programming work condition could be improved.

Also, the trigger condition can be easily changed and the setting operation of the storage file can be readily modified. Therefore, the desired storage file can be readily formed without having knowledge about the device of the control appliance 4.

Furthermore, the conditions of the plural control appliance 4 connected to the controller 1, namely such information about the accumulation time, the elapse time, and the number, obtained when being compared with a predetermined comparison value can be easily acquired in high precision without any temporal error, and also the line can be surely monitored, so that the stage analyzing capability can be improved.

(Embodiment 6)

Referring now to FIG. 30 to FIG. 35, a data acquiring/function according to an embodiment of the present invention will be described.

Figure 30:
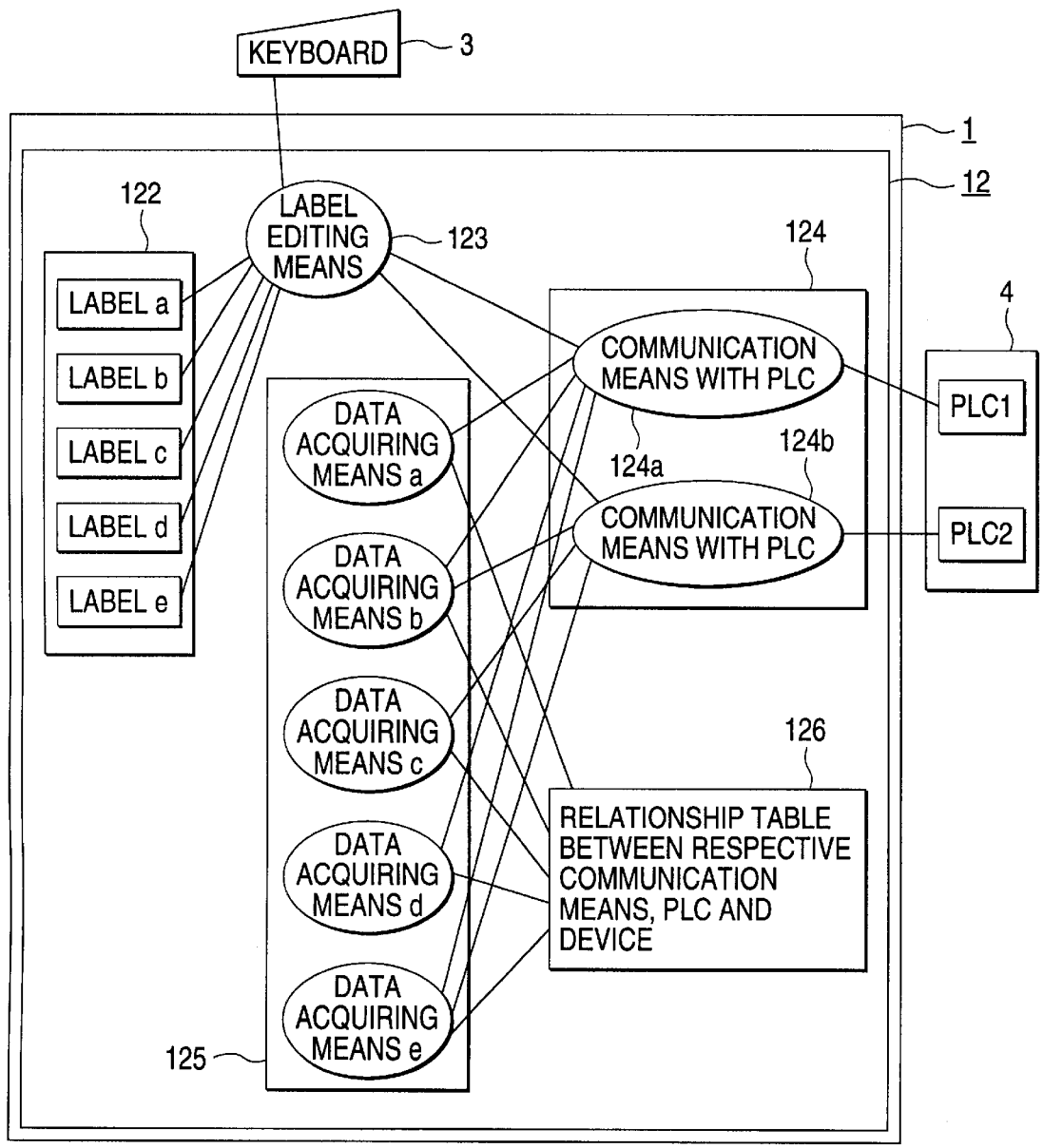
FIG. 30 is a block diagram showing an arrangement of a data processing apparatus having a data acquisition function according to an embodiment of the present invention.

FIG. 30 is a block diagram for representing an arrangement of a data processing apparatus having a data acquisition function according to an embodiment of the present invention. In this drawing, reference numeral 1 shows a control apparatus (controller) for controlling an appliance connected thereto. To this controller 1, a CRT2 functioning as a display unit, a keyboard 3 functioning as an input unit, and a control appliance 4 containing a plurality of PLCs and a plurality of PCs are connected.

Within the controller 1, there are provided a CPU for executing a user application program and a program such as a preset control program, a memory 12 for storing the user application program and the preset control program, and an interface with an auxiliary storage unit 13, a CRT, a keyboard 3, and a control appliance 4.

In this case, the memory 12 contains a label for setting data 122 used to acquire data from the control appliance 4 into which at least a name of a read destination control appliance, a name of a read device, and a device No. are stored; label editing means 123 for editing data written into a plurality of labels (a to e) within this label 122 based upon the same control appliance name and the same device name; communication means 124 for reading data with respect to a specific control appliance 4 and a specific device; data acquiring means 125 or selectively deriving such data required to the respective labels (a to e) from the data read out from the control appliance 4 by the communication means 124; and a table 126 for storing therein a relationship among the respective communication means 124, the control appliance, the read device provided with the control appliance 4.

FIG. 31 is a diagram for selectively indicating only the "read destination control appliance name", the "read device name", and the "device No." among the data stored in the label 122.

FIG. 32 is a diagram for representing the contents of the table 126 into which the relationship among the respective communication means 124, control appliance 4, and device.

Figure 33:
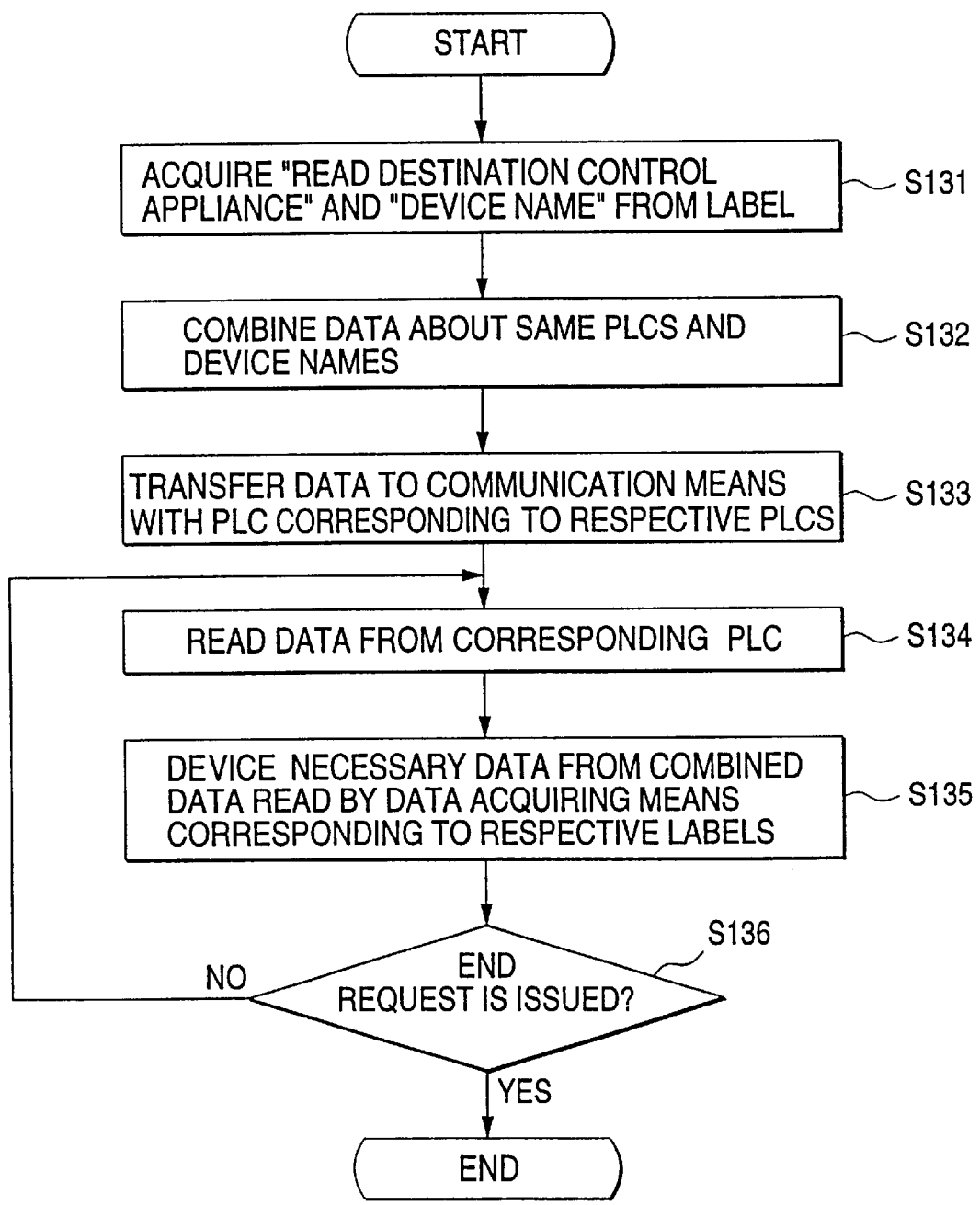
FIG. 33 is a flow chart indicating a process operation of a controller.

FIG. 33 is a flow chart for briefly indicating process operation of the controller 1.

Figure 34:
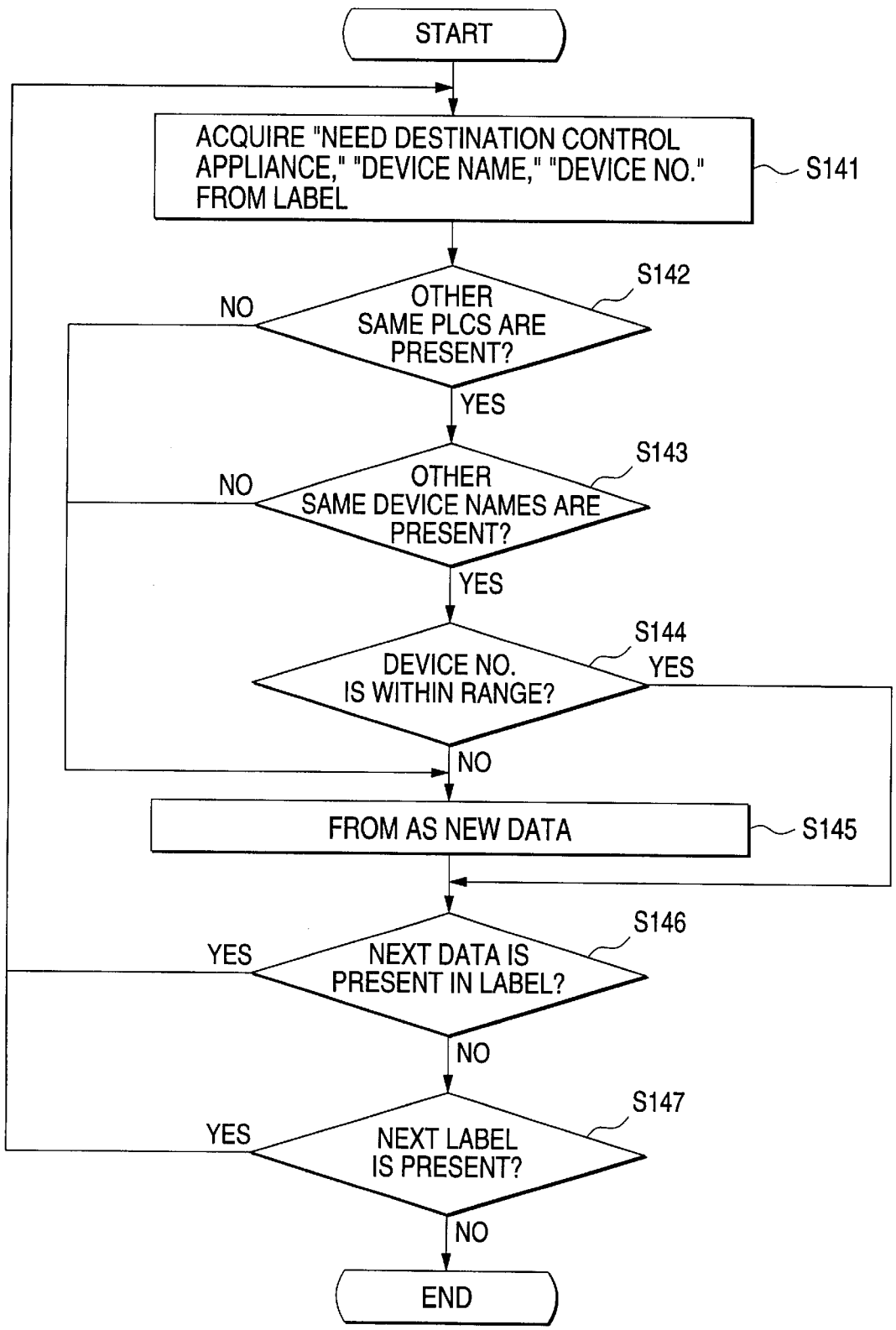
FIG. 34 is a flow chart showing a process operation of label editing means.

FIG. 34 is a flow chart for representing process operation of the label editing means 123.

Figure 35:
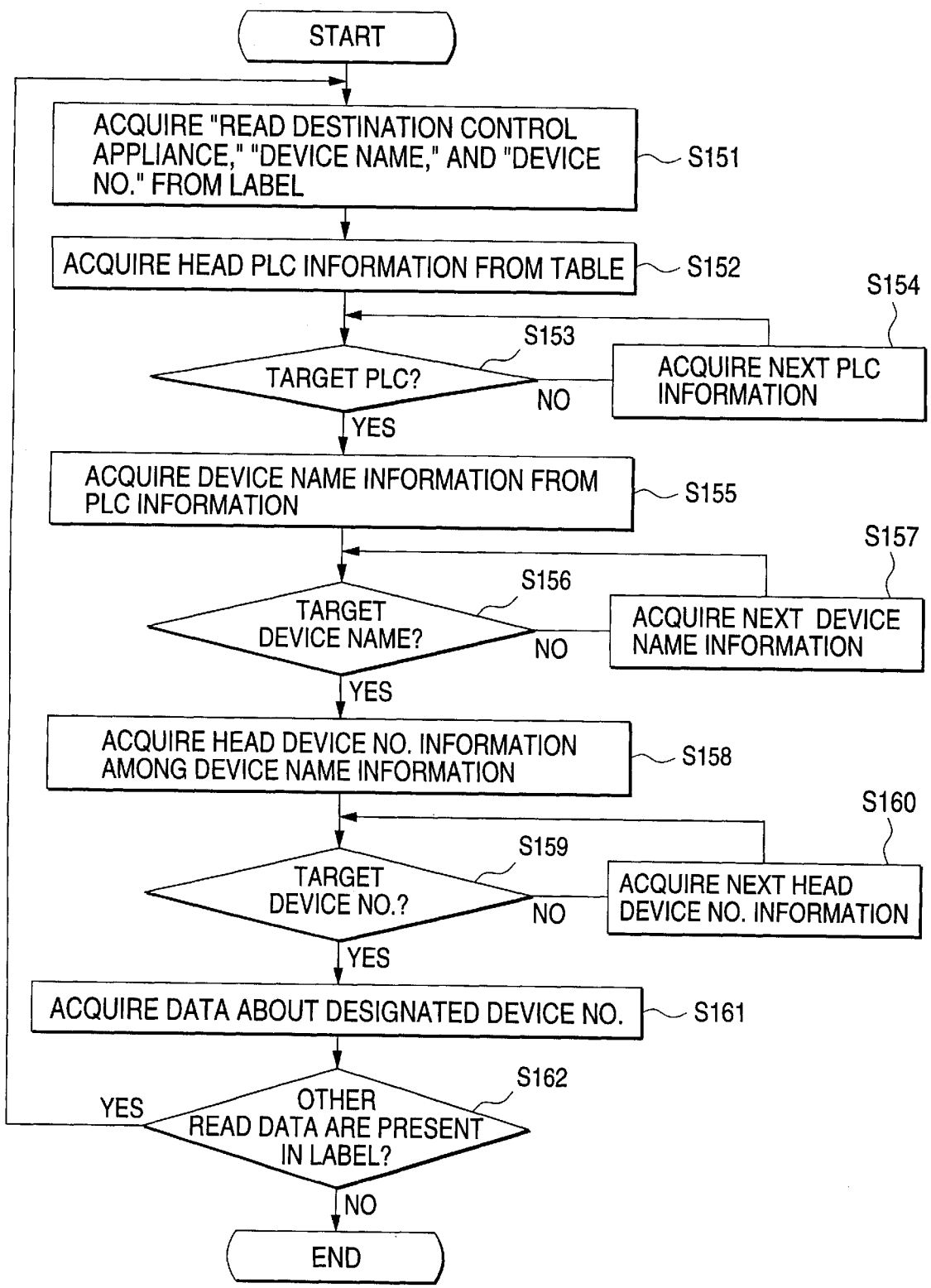
FIG. 35 is a flow chart showing a process operation when necessary data is acquired from communication means with reference to a table by data acquiring means.

FIG. 35 is another flow chart for showing process operation to acquire the necessary data from the communication means with reference to the table 126 by the data acquiring means 125.

First, the brief operation of the controller 1 will now be explained with employment of FIG. 33.

When an operator inputs a data acquisition starting signal from the keyboard 3, at a step S131, the read destination control appliance and the device name are derived from the respective labels a, b, c, d, e on which the read destination control appliance and the device name are written, by the label editing means 123. At a step S132, the same items are combined with each other among them. At this time, a check is done as to whether or not these same items are within the maximum size range where all of the device data can communicate with each other within once. If the device data exceed this maximum size range, even when there are the same device data, these device data are separately combined with each other. For instance, in such a case that there are five sorts of labels (a to e) as shown in FIG. 31, the data about the same control appliances are combined with each other, and the resultant data are indicated in FIG. 32. It should be noted a point range readable within one time is 500.

Thereafter, at a step S133, each of the combined data groups is transferred to the communication means 124a and 124b corresponding to a plurality of control appliances (PLC4a and PLC4b in this embodiment), and then the process operation is advanced to a step S134.

At a step S134, each of these communication means 124a and 124b, to which the data has been supplied, reads at the data from the head No. of the respective devices up to the reading point, which are designated in the table 126, and then stores the read data, and thereafter, the process operation is advanced to a step S135.

In other words the same data designated in the plural labels are read within one time.

Then, at a step S135, the read data are acquired by the data acquisition means corresponding to the label 122a, the label b, the label c, the label d, and the label e with reference to the table 126 in such a manner that data in the ranges required to the respective labels are selected.

At this time, the relationship how to acquire the data by the respective acquisition means from which communication means is obtained with reference to the table 126.

Subsequently, at a step S136, a check is made as to whether or not a request to accomplish the data acquisition is issued from the keyboard 3. If such an end request is issued, then a series of the process operation is completed. If such an end request is not yet issued, then the process operation is returned to the step S134. At this step S134, the data acquisition process operation is repeated until the data acquisition end signal is issued from the keyboard 3, and the data read process operation is repeatedly performed with respect to the same data.

Next, the flow operations of the label editing means 123 will now be described with reference to FIG. 34.

At a first step S141, the read destination control appliance, the device name, and the device No. are derived from the first label.

For example, when the content of the label 122 is such data as illustrated in FIG. 32, as to the firstly read data, it is assumed that the "read destination control appliance" is "1 (PLC 4*a*)", the "read device name" is "D", and the "device No." is "0".

Next, another check is done at a step S142 as to whether or not other data are left in the same control appliance. Since this present data corresponds to firstly read data, it is conceivable that there is no data in the same control appliance (PLC1). Thus, the process operation is advanced to a step S145 at which a table is produced by using this data as new data.

In this case, assuming now that the point readable within one time in this system is equal to 500, when the table data are formed while the head No. of the read device is "0" and the read point is 500, the table data are defined as in the column of the communication means 124*a* of FIG. 32.

Then, another check is made at a step S146 as to whether or not subsequent data is present in the same label. If there is the subsequent data as shown in the label 38*a*, then the process operation is returned to the step S141 at which the subsequent data is acquired. On the other hand, if there is no next data, then the process operation is advanced to a step S147 at which a check is made as to whether or not there is a next label.

Now, when there is a next label, the process operation is returned to the step S141, whereas when there is no next label, the process operation is advanced to a further step S149 at which the process operation is accomplished.

Next, the processing operation is carried out n such a case that second data of the label 122 is acquired at the step S141.

That is, this second data is now assumed that the "read destination control appliance" is "1"; the "device name" is "D"; and the "device No." is "100". At this time, since the data of the same control appliance (PLC1) has been previously formed at the checking step of the step S142, the process operation is advanced to a step S143 at which another check is done as to whether or not the data of the same device name is present in the table. If there is no same device name data, then the process operation is advanced to a step S145. However, since there is the same device name in the present data, the process operation is advanced to a step S144. At this step S144, a check is done as to whether or not the designated device No. is present within the data range registered in the table. In this case, since the designated device No. is 100 and then is present within such a range from the head No. of the data contained in the table to 500 points (namely, 0≦(designated No.)<500), so that this designated device No. is contained in the column of the communication means 124*a* of FIG. 32, no new table data is produced and then the process operation is advanced to a step S146. To the contrary, if the designated device No. is larger than, or equal to 500, then this designated device No. is located outside the range of the existing data, so that new data is produced at a step S145.

Next, a description will now be made of process operation executed when the content of the label b is edited.

First, a check similar to the above-described check for the data of the label a is carried out with respect to first data. Since it can be seen that this first data is contained in the table data of the communication means 124*a*, no new table is produced.

Subsequently, the process operation is returned to the step S141 at which second data of the label b is acquired, namely, the "read destination control appliance" is "2(PLC2)", the "device name" is "D", and the "device No." is "500". In this case, since only the table data of "1" is present in the read destination control appliance and the same PLC2 data is not present in the check operation of the step S142, the process operation is advanced to a step S145 at which such a table data that the "read destination control appliance" data is "2(PLC2)" is formed. At this time, the head No. of the read device is "500", and the read point is "500", namely 500points from 500 to 999.

While the editing process is performed in a similar manner to that of the above-described manner, the label c is contained in the table data of the communication means 124*b*, and the label d is involved in the communication means 124*a*. Then, after the process operation for the second data of the label e has been accomplished, since no next label is present by the judgement result made at the step S147, the process operation is advanced to a step S148 at which the process operation is ended.

The two sets of table data as shown in FIG. 32 are formed from the five labels of FIG. 31 in the above-described manner. It should be assumed that the data are stored in this table in such a manner that the data sequence is rearranged in accordance with the serial number of control appliances, and the head read number is rearranged according to this serial number thereof.

Referring now to a flow chart of FIG. 35, operations of the data acquisition means 125 will be described.

At a first step S151, the "read destination control appliance", the "device name", and the "device No." are acquired from the label a, the label b, the label c, the label d, and the label e, which handle the data acquisition means.

It is now assumed that if the data acquisition means "a" is handles, then the data is derived from the label a, and if the data acquisition means "b", then the data is derived from the label b.

If the label a is such data as shown in FIG. 31, then the "read destination control appliance" is "PLC1", the "device name" is "D", and the "device No." is "0".

At the next step S152, the head PLC information of the "read destination control appliance" contained in the table data is acquired into which the data acquired from the control appliance 4 have been stored. In this case, when the content of the table data is indicated as in FIG. 32, the head PLC information becomes "1".

Then, at a step S153, a check is made as to whether or not the "read destination control appliance" acquired from the table is identical to the data about "read destination control appliance" of the label. If this "read destination control appliance" is not identical to the data about "read destination control appliance" of the label, subsequent head PLC information contained in the table is acquired at a step S154.

Now, if the data are given as shown in FIG. 31 and FIG. 32, then the data "PLC1" of the "read destination control appliance" is identical to these data, so that the process operation is advanced to a step S155 at which a "device name" contained in this PLC information is acquired. In case of FIG. 32, the "device name" is "D".

Next, a check is made as to whether or not the "device name" acquired from the table is identical to the data of the label. If this device name is not identical to the data of the label, then the next device name information contained in the table is acquired at a step S157. If such data as shown in FIG. 32 is present, since the "device name (D)" is identical to this data, the process operation is advanced to a step S158 at which a "head read No." and a "read point" contained in this device name information are acquired. In the case of the data of FIG. 32, the "head read No." is "0" and the "read point" is "500 points".

Next, at a step S159, another check is done as to whether or not the designated device No. in the label is contained in the point range of the read device acquired from the table. If this designated device No. is not contained in the point range, then the process operation is advanced to a step S160 at which next head read No. information is acquired. If such data as shown in FIG. 32 is contained, since the designated "device No." is involved in such a range from the "head read No." in the table data to the "read point", the process operation is advanced to a step S161.

It could be understood that the data acquisition means "a" may acquire the head data among the data about 500 points from PLC1 read by the communication means 124a. Then, the data of the "device No.(0)" designated in the label a at the step S161 is obtained.

Subsequently, at a step S162, a further check is done as to whether or not the next "read destination control appliance" data ia designated in the label. For example, if the label a in FIG. 32 is designated, since second data "PLC2" is present, the process operation is returned to the step S151 at which the data acquisition process operation is repeated. If the last data in this label is designated, then the process operation is accomplished.

According to this embodiment, even when there are the same device name data in a plurality of labels, all of such data (read destination control appliance, and device name) are combined with each other. Based on the combined information, the data can be acquired from the control appliances within one time, so that it is possible to eliminate waste operations. That is, the same device data are repeatedly read. Also, a total number of communication process operations with the control appliance, whose process time becomes relatively long, can be reduced, and therefore the workload given to the controller can be reduced.

Also, since the same device data set in a plurality of labels are read within one time, there is no problem such that the data values are deviated every reading operation even when the same device values are present as in such a case that the communications are established with the control appliances every label. Accordingly, reliability in the data acquisition could be increased.

(Embodiment 7)

Referring now to FIG. 36 to FIG. 40, a rearrangement of according to an embodiment of the present invention will be described.

Figures 36, 37:
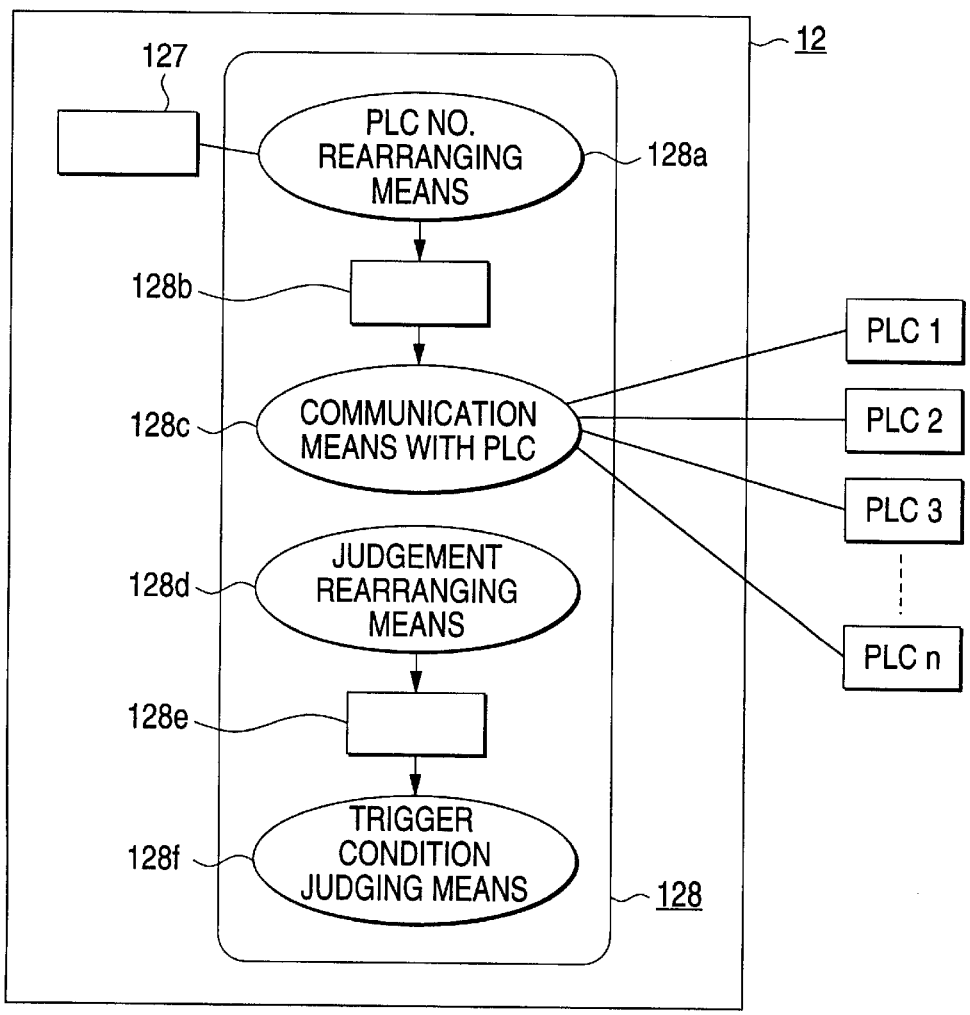
FIG. 36 is a block diagram showing an arrangement of a data processing apparatus having a trigger condition rearranging function according to an embodiment of the present invention.
FIG. 37 is a block diagram showing an arrangement of a PLC data table.

FIG. 36 is a block diagram for representing an arrangement of a data processing apparatus having a trigger condition rearranging function according to an embodiment of the present invention. In this drawing, a memory 12 employed in a control apparatus (controller) for connecting an appliance connected thereto includes a label 127 for storing therein information used to read the trigger condition from the control appliance; and trigger condition reading means 128 for reading information from the control appliances (PLC1, PLC2, - - -, PLCn) based on the information of this label 127.

The trigger condition reading means 128 employed in the memory 12 includes PLCNO. rearranging means 128a for sequentially deriving the trigger condition information contained in the label 127 from the head thereof every PLCNO.; a PLC data table 128b for registering the trigger conditions rearranged every PLCNo. based on this PLCNo. rearranging means 128a; and communication means 128c for acquiring the trigger condition and the device data from the device data from the control appliances and for transmitting the data to the control appliances. This trigger condition reading means 128 further includes judgement rearranging means 128d for rearranging the trigger information read out every PCNo. in the order registered in the label; a trigger storage table 128e for storing therein the trigger condition information in the order registered in the label 127; and trigger condition judging means 128f for judging the trigger condition in the order registered in the label 127.

FIG. 37 is a block diagram for representing a structure of the PLC data table 128b. This PLC data table 128b owns such a condition that the information as shown in FIG. 39 with respect to each of the PLCNo. is rearranged in a small order of PLCNo.

FIG. 38 is a block diagram for showing an arrangement of the trigger data storage table 128e. In this trigger data storage table 128e, the trigger information read from the control appliance by the communication means 128c with PLC is stored in the same order as that of the information of the label 127 shown in FIG. 39.

Figure 40:
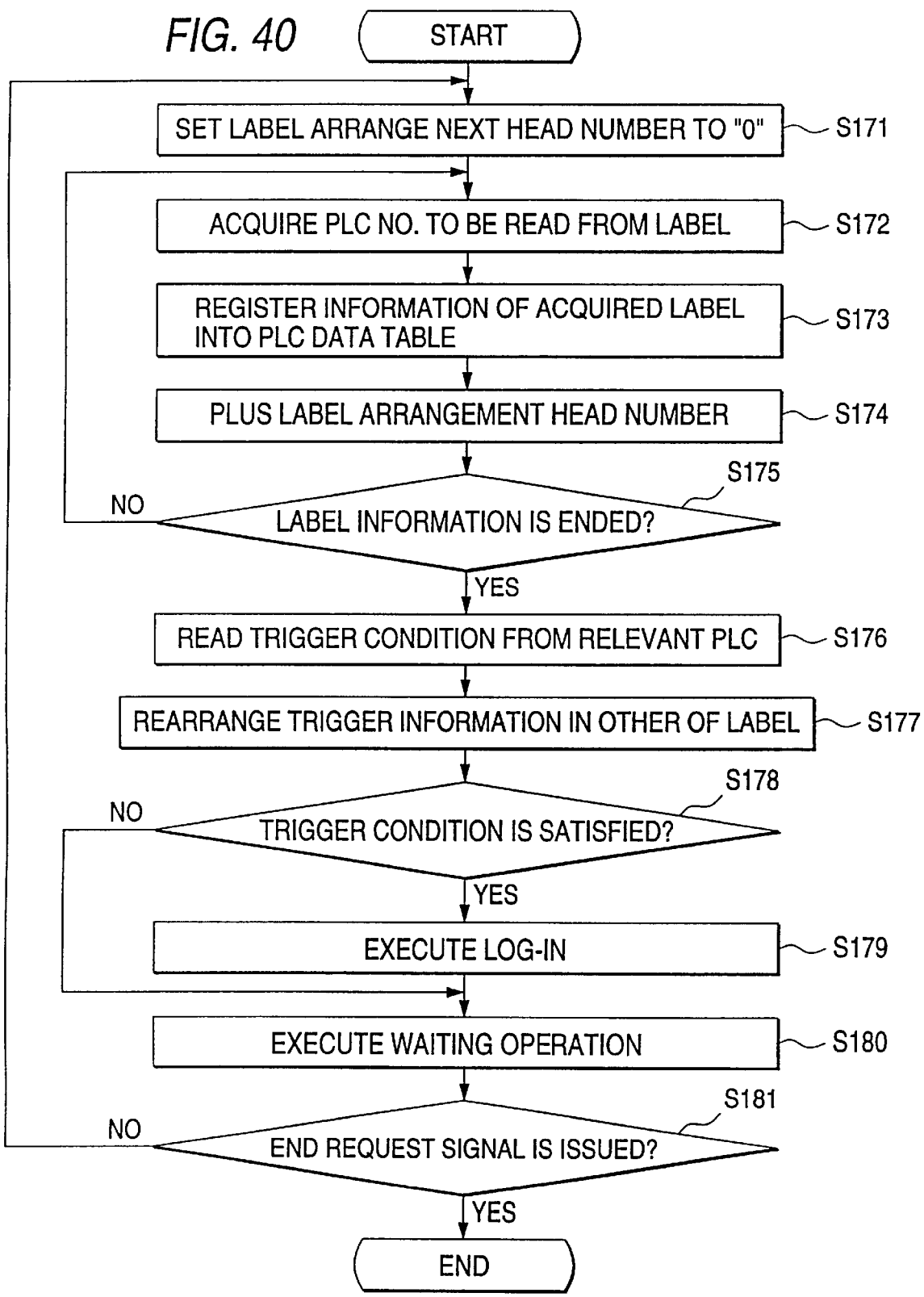
FIG. 40 is a flow chart showing a process operation of trigger condition reading means.

FIG. 40 is a flow chart for describing process operations of the trigger condition reading means.

At a step S171, a label arranging head number of the PLC data table 128b is set to "0" in accordance with the PLCNo. rearranging order 128a, and then the process operation is advanced to a step S172.

At the step 172, "PLCNo." of first trigger condition information read from the label 127 is acquired, and then the process operation is advanced to a step S173.

At this step S173, the "device name" and "device No." among the first trigger condition information from the label 127 are registered in the PLC data table 128b corresponding to the first PLCNo., and then the process operation is advanced to a step S174.

At the step S174, the label arranging head number is added, and the process operation is advanced to a step S175.

At this step S175, a check is made as to whether or not all of the trigger condition information have been acquired within the label 127. When all of the trigger condition information have been acquired, a communication is established with PLC of this PLCNo. by employing the communication means 128c with PLC to thereby read out the trigger condition information, and then the read trigger condition information is stored into, for instance, a memory used to store the trigger condition information at a step S176.

On the other hand, if all of the trigger condition information among the label 127 have not yet been acquired at the above step S175, then the process operation is returned to the step S172 at which the "PLCNo." is regain acquired.

At a step S177, the trigger condition information for each of the PLCNo., which has been read out in the registering order of the label 127 is rearranged by employing the judgement rearranging sequence 128d.

The first "PLCNo." corresponding to the head of the label 127 is acquired, the trigger information at the head of the PLC data table 128b is read, and then the first trigger information of the PLC1 is stored into the trigger data storage table 128e of the relevant arranging number.

Subsequently, a second "PLCNo." of the label 127 is acquired, the second trigger information of the PLC data table 128b is read, and then the second trigger information of the read PLC1 is stored into the trigger data storage table 128e of this relevant arranging number. This process operation is continued until all of the information of the label 127 have been processed.

At a step 178, the trigger condition of the label 127 is compared with the content of the trigger data storage table 128e which have been rearranged by the judgement rearranging means 128d. When the trigger condition is satisfied, a data locking operation for acquiring the device data from the control appliance by the locking function.

If the locking condition could not be satisfied at a step 178, then a waiting operation is immediately performed by a waiting means for a time period equal to the trigger monitoring interval.

At a step S181, another check is made as to whether or not an end request is entered from the keyboard connected to the controller. If the end request signal is entered, then the process operation is ended. Conversely, if the end request signal is not inputted, then the process operation is returned to the step S171 at which the trigger condition reading operation is performed.

In accordance with this embodiment, when the trigger condition is acquired from the control appliance, the information of the label 127 is rearranged in response to No. of the control appliance. As a consequence, even in such a case that the data designations for the plural control numbers are made in a single label and then these data are alternately designated, the trigger conditions can be acquired every control appliance number. Therefore, the numbers of communications with respect to the control appliances can be reduced and then the workload for the controller can be reduced.

Also, since the read trigger condition information is rearranged in the original designated sequence, the judgements of the trigger conditions can be carried out in the registering order without any change in the order registered in the label.

(Embodiment 8)

Figure 41:
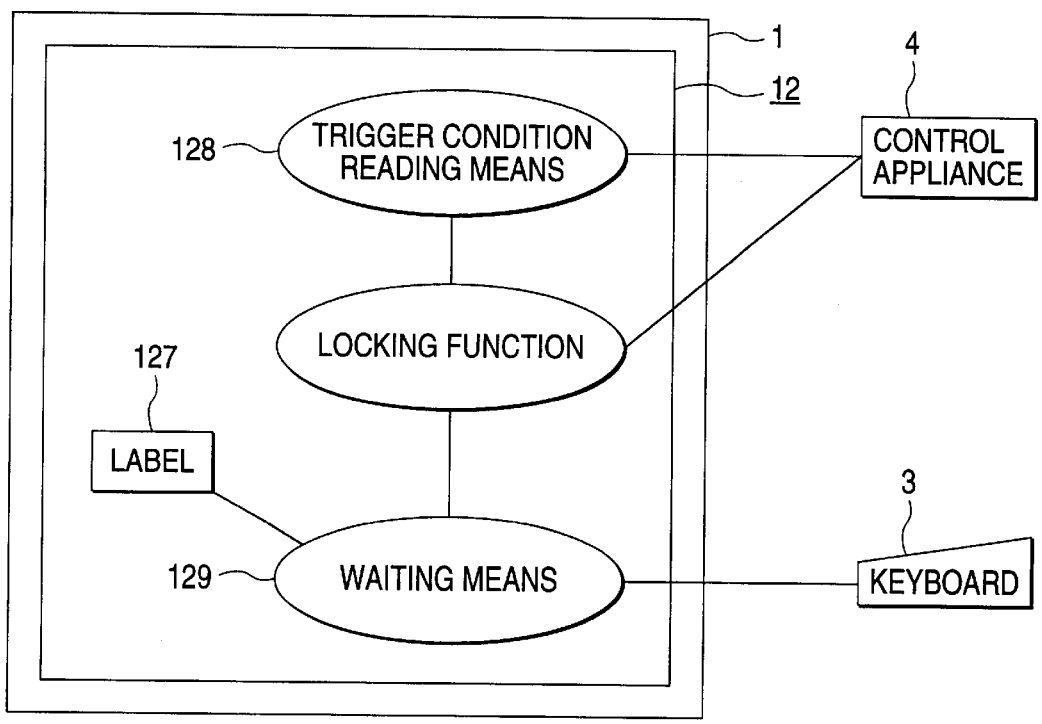
FIG. 41 is a block diagram showing an arrangement of a data processing apparatus having waiting means according an embodiment of the present invention.
Figure 42:
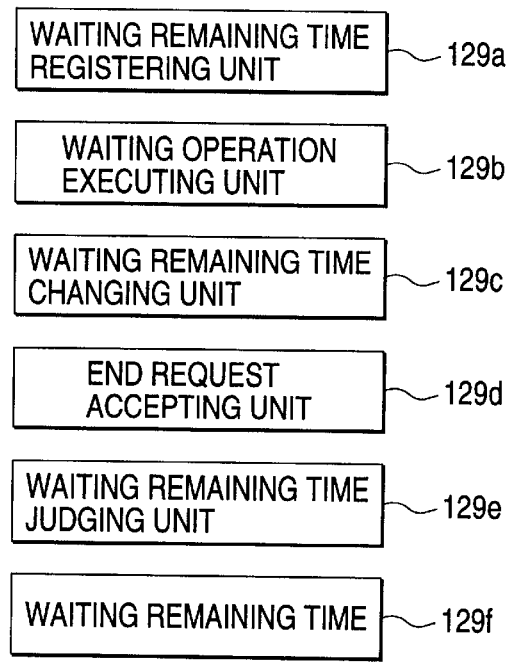
FIG. 42 is a block diagram showing an arrangement of the waiting means.

Referring now to FIG. 41 to FIG. 42, a waiting operation for a data acquisition according to an embodiment of the present invention will be described.

FIG. 41 is a block diagram for representing an arrangement of a data processing apparatus having a waiting means according to an embodiment of the present invention. In this drawing, reference numeral 1 shows a control apparatus (controller) for controlling an appliance connected thereto, reference numeral 3 shows a keyboard for performing an input operation, reference numeral 4 represents a control appliance, and reference numeral 12 denotes a memory employed in the controller 1.

Inside the memory 12, there are provided a label 127 for storing therein information used to read out a trigger condition from the control appliance; trigger condition reading means 128 for reading information from the control appliance based upon this information of the label 127; a log-in mechanism for reading device data from the control appliance; and waiting means 129 for performing a waiting operation during a trigger monitoring interval stored in the label 127.

FIG. 42 is a block diagram for indicating an arrangement of the waiting means 129 equipped with means for accepting an end request issued from the keyboard 3 even during the waiting operation. In this drawing, reference numeral 129a shows a waiting operation remaining time registering unit for registering the trigger monitoring interval into waiting operation remaining time 129, reference numeral 129b denotes a waiting operation executing unit for executing the waiting operation every preselected time, reference numeral 129c represents a waiting operation remaining time changing unit for subtracting a constant time for actually performing the waiting operation from the waiting operation remaining time to change the waiting operation remaining time. Also, reference numeral 129d shows an end request accepting unit for accepting an end request signal entered from the keyboard 3 to thereby judge as to whether or not the end request is issued, reference numeral 129e denotes a waiting operation remaining time judging unit for judging the waiting operation remaining time and for repeatedly performing the waiting operation when there is still waiting operation remaining time, and reference numeral 129f represents a waiting operation remaining time for storing the waiting operation remaining time.

Figure 43:
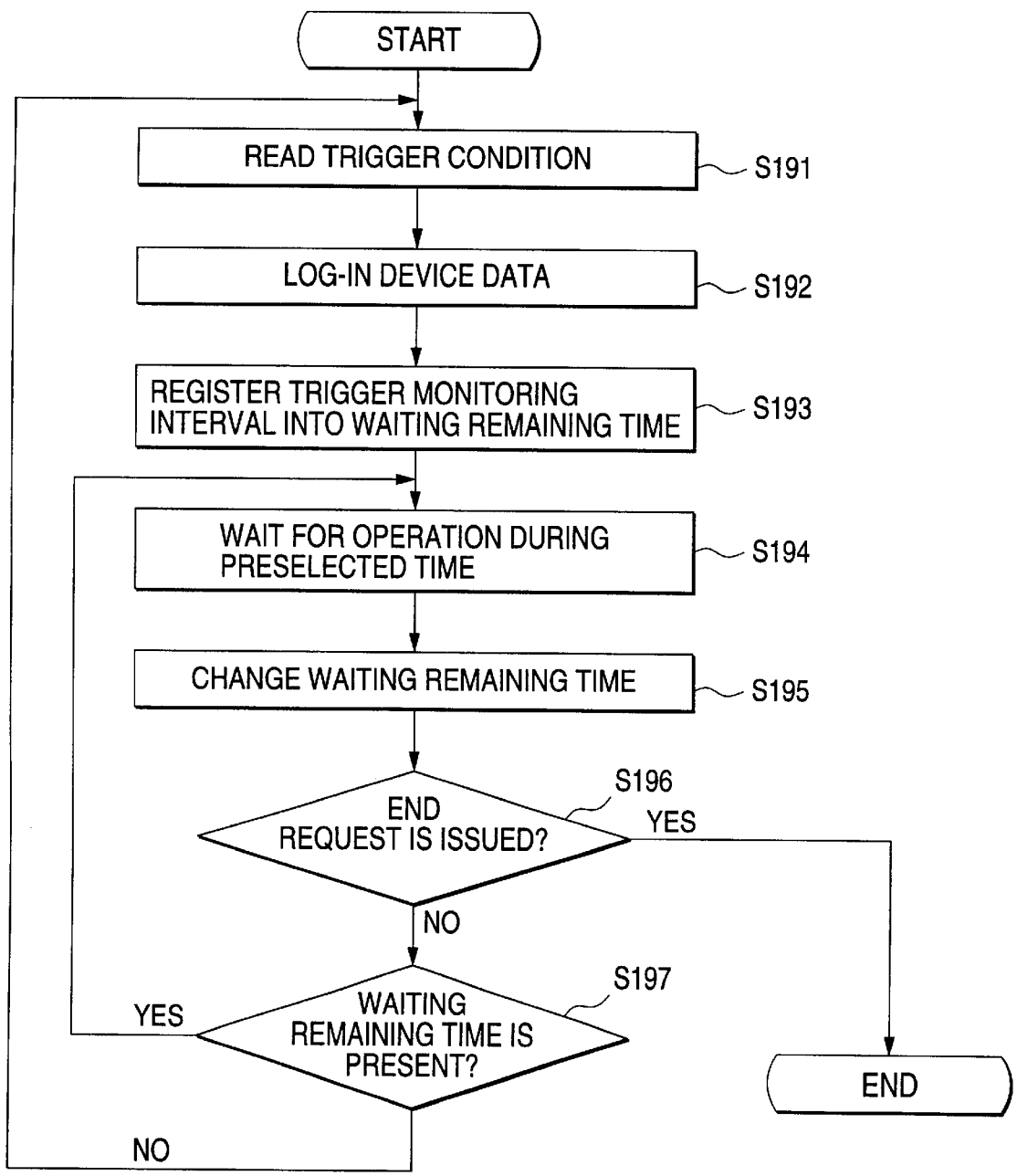
FIG. 43 is a flow chart representing operations of the waiting means according to this embodiment.
Figure 44:
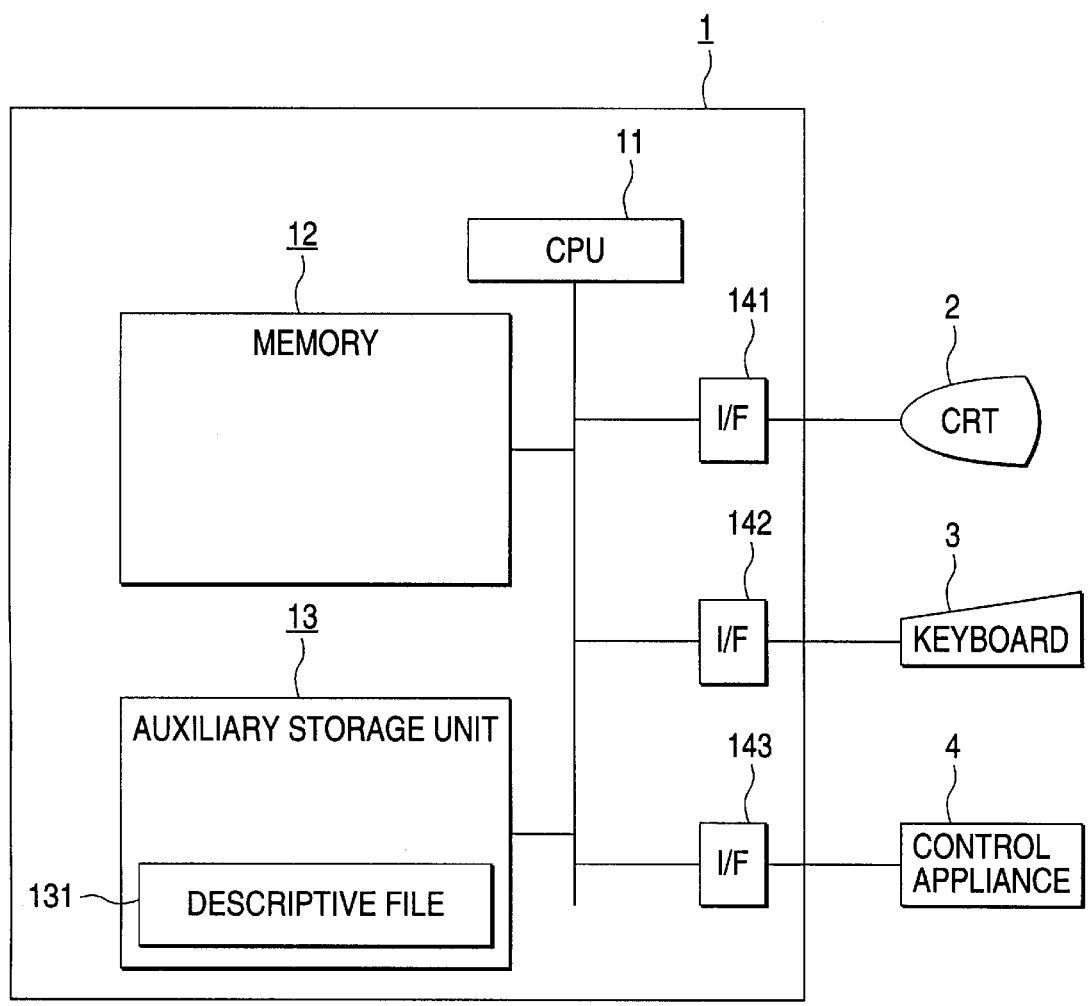
FIG. 44 is a block diagram representing the arrangement of the conventional data processing apparatus.

FIG. 43 is a flow chart for describing operations of the waiting operation means according to this embodiment.

With reference to the flow operation of FIG. 43, the waiting operation by this waiting operation means will now be explained.

At a first step S191, in response to the information of the label 127, the trigger condition reading means 127 reads out a trigger condition used to read out the device data from the control appliance 4, and then the process operation is advanced to a step S192.

At this step S192, when the trigger condition is made coincident, the device data derived from the control appliance is log-in based upon the log-in function, and then the process operation is advanced to a step S193.

At the step S193, the trigger monitoring interval stored in the label 127 is registered into the waiting operation remaining time 129f within the waiting means 129. Then, at a step S194, the waiting operation is executed for a preselected time by the waiting operation executing unit 129b. At this time, when the waiting operation remaining time registered in the waiting operation remaining time 129f is longer than, or equal to "1 second", a predetermined time is equal to "1 second". When the waiting operation remaining time is shorter than "1 second", a predetermined time implies a waiting operation remaining time.

Thereafter, at a step S195, the actually waiting time is subtracted from the waiting operation remaining time in the waiting operation remaining time changing unit 129c so as to change the waiting operation remaining time, and then the process operation is advanced to a step S196.

At a step S196, a check is made as to whether or not an end request is issued from the end request accepting unit 129d via the keyboard 3. If such an end request is issued, then the end process operation is performed.

On the other hand, when no end request is issued via the keyboard 3 at the step S196, the process operation is advanced to a step S197 at which a judgement is made by the waiting operation remaining time judging unit 129e as to whether or not there is the waiting operation remaining time 129f.

If there is the waiting operation remaining time 129f, then the waiting operation defined from the step S194 is repeated. Conversely, if there is no waiting operation remaining time 129f, then the trigger condition reading operation defined from the step S191 is repeatedly performed.

Conventionally, even when the end request is transmitted from the keyboard 3, this end request could not be accepted unless the waiting operation for a predetermined trigger monitoring interval is carried out. Therefore, the end process operation could not be carried out. To the contrary, in accordance with this embodiment, even when the waiting operation defined by the trigger monitoring interval is not completed, the end request can be accepted every preselected time interval ("1 second" in this embodiment). The end process operation can be performed even in such a case that the trigger monitoring interval is long (for example, 1 hour), or the waiting operation is being executed. Accordingly, the work capability could be increased.

Although this embodiment has described the end request, a similar process operation may be performed when other signals are received from the keyboard 3 and the control appliance 4.

Since the present invention has been arranged, as previously described, this invention owns the below-mentioned effects.

A data processing apparatus, according to the present invention, is comprised of: storage format setting means for setting a storage format in an interactive manner in order to store acquisition data in an arbitrary format, acquired from a control appliance connected thereto; storage file forming means for forming a storage file used to store said acquisition data based upon the storage format set by this storage format setting means; and storage means for storing the acquisition data acquired from said control appliance in the storage file formed by this storage file forming means in accordance with the storage format set by said storage format setting means.

As a consequence, the storage file used to store the data can be formed in the interactive manner by the simple operation, so that since the complex program is no longer required to be formed by the user himself, a large amount of time and a heavy workload required for the programming work can be reduced.

The specific knowledge required to execute the programming work is no longer required. Since such a simple work to answer to the interactive work is required, the editing work such as the correction becomes easy, and thus the user operability could be increased.

A storage processing apparatus, according to the present invention, is comprised of: storage format setting means for setting a descriptive format in an interactive manner in order to store acquisition data in an arbitrary format, acquired from a control appliance connected thereto; descriptive file forming means for forming a descriptive file based upon the descriptive format set by this descriptive format setting means; and write means for writing write data to said control means into the descriptive file formed by this descriptive file forming means.

As a consequence, the storage file used to store the data can be formed in the interactive manner by the simple operation, so that since the complex program is no longer required to be formed by the user himself, a large amount of time and a heavy workload required for the programming work can be reduced.

The specific knowledge required to execute the programming work is no longer required. Since such a simple work to answer to the interactive work is required, the editing work such as the correction becomes easy, and thus the user operability could be increased.

Since either the storage means or the write means processes the acquisition data acquired from the control appliance, or the write data written into the control appliance in a preselected format by employing a designated condition formula, and thereafter stores or describes the processed data, when the data is acquired or described, this data can be derived in the format required by the user without being processed again, so that the user operability could be improved.

Since either the acquisition data acquired from the connected control appliance or the write data for the connected control appliance is simultaneously set the storage format setting means or the descriptive format setting means, either the acquisition data, or the write data can be readily related to the storage format or the write format, and then the data can be easily set, so that the work capability could be increased.

Also, a data processing apparatus, according to the present invention, is comprised of: acquisition data setting means for setting a condition used to acquire acquisition data from a control appliance connected thereto; and data acquiring means for acquiring the acquisition data from said control appliance based upon the condition set by this acquisition data setting means, it is readily possible to form the condition used to acquire the acquisition data from the control appliance in the interactive format. Since the program for setting the condition is no longer required by the user himself, a large amount of time and a heavy workload required for the programming work can be reduced.

The specific knowledge required to execute the programming work is no longer required. Since such a simple work to answer to the interactive work is required, the editing work such as the correction becomes easy, and thus the user operability could be increased.

Since the acquisition data acquired from the control appliance by the data acquiring means is compared with predetermined monitor comparison data to thereby store a history when said acquisition data is coincident with said monitor comparison data, the data processing apparatus itself can own the history based on the data of the control appliance, so that the manufacturing stage management capability for the manufacturing line can be increased.

Also, data processing apparatus is comprised of: a production instruction data file for storing therein production instruction data on which processing condition for each of products manufactured by the connected control appliance have been described; comparing means for comparing a specific item of the production instruction data stored in this production instruction data file with the acquisition data acquired from the control appliance; and production instructing means for instructing said control appliance to start a production when said comparing means judges that said acquisition data corresponds to the specific item of said production instruction data based upon said production instruction data corresponding to said acquisition data. Accordingly, the production instruction can be issued to only such a case that the specific item of the production instruction data corresponds to the acquisition data. Thus, the data about the production instruction can be managed in a batch manner, so that the maintenance and the management can be easily performed.

Since the data processing apparatus is comprised of editing means for editing the condition data for the data acquisition set so as to acquire the acquisition data from the connected control appliance in unit of said connected control appliance, the time required for the data communication can be shortened by reducing the numbers of data transmissions between the control appliance and the data processing apparatus. The necessary data can be immediately transmitted/received, so that the manufacturing stage analysis capabilities such as the line monitoring operation can be improved, and thus the production capabilities can be improved.

Since the acquisition data acquired every control appliance are restored in correspondence with the conditions set by said acquisition data setting means, only the required data can be easily handled, so that the data maintenance and management can be readily performed.

Also, the data processing apparatus is comprised of: a waiting time registering unit for registering therein waiting time in order to interrupt a data processing operation; and an end request accepting unit for subdividing said waiting time every preselected time interval, and for judging as to whether or not an end request is inputted, which instructs an end of the data processing operation every subdivided time interval; in which when said end instruction accepting unit judges such that the end request is entered, the data processing operation is accomplished. In such a case that the end request for notifying the end of the data processing operation is entered, the data processing apparatus can respond to this end request, so that the waste waiting time can be reduced and thus the productivities can be improved.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A data processing apparatus comprising:
    a controller operable to control a device connected to the controller, the controller including:
    a processor;
        a memory operable as a function of the processor, wherein the memory includes a computer readable medium on which is stored at least one computer program, the at least one computer program of the memory storing instructions which, when executed, enable a user to interactively define and set a storage format for storing acquisition data acquired from the device; and
    a storage device operable to form a plurality of files, at least one of the plurality of files formed based upon the storage format set by the at least one computer program, and used to store the acquisition data.

2. A data processing apparatus as claimed in claim 1, wherein said controller processes the acquisition data acquired from the device in a preselected format by employing a designated condition formula to store the processed data.

3. A data processing apparatus as claimed in claim 1, wherein the acquisition data acquired from the device is simultaneously set by said at least one computer program.

4. A data processing apparatus as claimed in claim 1, further comprising:
    a waiting time registering unit for registering therein a waiting time to interrupt a data processing operation; and
    an end request accepting unit for subdividing said waiting time into preselected time intervals, and for judging as to whether or not an end request is inputted, which instructs an end of the data processing operation, every subdivided time interval;
    wherein when said end instruction accepting unit judges that the end request is entered, the data processing operation is accomplished.

5. A data processing apparatus according to claim 1, further including an input device for enabling the user to provide control information to the controller.

6. A data processing apparatus according to claim 1, further including a display device for displaying information as a function of receiving data from the controller and the acquisition data from the device.

7. A data processing apparatus according to claim 1, wherein the computer readable medium includes an acquisition and storage computer program, the acquisition and storage computer program of the memory storing instructions which, when executed, allow the controller to acquire, process, and store the acquisition data.

8. A data processing apparatus comprising:
    a controller operable to control a device connected to the controller, the controller including:
    a processor;
    a memory operable as a function of the processor, wherein the memory includes a computer readable medium on which is stored at least one computer program, the at least one computer program of the memory storing instructions which, when executed, enable a user to interactively define and set a descriptive format for storing acquisition data acquired from the device;
    a storage device operable to form a plurality of files, at least one of the plurality of files formed based upon the descriptive format set by the at least one computer program, and
    a writing device operable to write data into the descriptive file formed by said storage device.

9. A data processing apparatus as claimed in claim 8, wherein said controller processes data to be written into the device in a preselected format by employing a designated condition formula to describe the processed data.

10. A data processing apparatus as claimed in claim 8, wherein the data for the device is simultaneously set by said at least one computer program.

11. A data processing apparatus as claimed in claim 8, further comprising:
    a waiting time registering unit for registering therein a waiting time to interrupt a data processing operation; and
    an end request accepting unit for subdividing said waiting time into preselected time intervals, and for judging as to whether or not an end request is inputted, which instructs an end of the data processing operation, every subdivided time interval;
    wherein when said end instruction accepting unit judges that the end request is entered, the data processing operation is accomplished.

12. A data processing apparatus according to claim 8, further including an input device for enabling the user to provide control information to the controller.

13. A data processing apparatus according to claim 8, wherein the computer readable medium includes a converting and writing computer program, the converting and writing computer program of the memory storing instructions which, when executed, allow the controller to convert and write the acquisition data.

14. A data processing apparatus comprising:
    a controller operable to control a device connected to the controller, the controller including:
    a processor;
    a memory operable as a function of the processor, wherein the memory includes a computer readable medium on which is stored at least one computer program, the at least one computer program of the memory storing instructions which, when executed, enable a user to interactively define and set a condition used to acquire acquisition data from the device; and
    a data acquisition device operable to acquire the acquisition data from the device based upon the condition set by the at least one computer program.

15. A data processing apparatus as claimed in claim 14, wherein the acquisition data acquired from the device is compared with predetermined monitor comparison data to store a history when said acquisition data is coincident with said monitor comparison data.

16. A data processing apparatus as claimed in claim 14, further comprising:

a production instruction data file for storing therein production instruction data on which processing conditions for each product manufactured by the device have been described;

comparing means for comparing a specific item of the production instruction data stored in said production instruction data file with the acquisition data acquired from the device; and production instructing means for instructing said device to start production when said comparing means judges that said acquisition data corresponds to the specific item of said production instruction data based upon said production instruction data corresponding to said acquisition data.

17. A data processing apparatus as claimed in claim 14, further comprising an editor for editing the condition used to acquire the acquisition data from the device.

18. A data processing apparatus as claimed in claim 14, wherein the acquisition data acquired are restored in correspondence with the set condition.

19. A data processing apparatus as claimed in claim 14, further comprising:

a waiting time registering unit for registering therein a waiting time in order to interrupt a data processing operation; and an end request accepting unit for subdividing said waiting time into preselected time intervals, and for judging as to whether or not an end request is inputted, which instructs an end of the data processing operation, every subdivided time interval;

wherein when said end instruction accepting unit judges that the end request is entered, the data processing operation is accomplished.

20. A data processing apparatus according to claim 14, further including an input device for enabling the user to provide control information to the controller.

* * * * *